US008611198B2

(12) United States Patent
Watanabe et al.

(10) Patent No.: US 8,611,198 B2
(45) Date of Patent: Dec. 17, 2013

(54) METHOD FOR IDENTIFYING GROUP OF MULTILAYER DISC, AND OPTICAL DISC DEVICE

(75) Inventors: Katsuya Watanabe, Ehime (JP); Shinichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/147,625

(22) PCT Filed: Jan. 28, 2010

(86) PCT No.: PCT/JP2010/000478
§ 371 (c)(1),
(2), (4) Date: Aug. 3, 2011

(87) PCT Pub. No.: WO2010/092756
PCT Pub. Date: Aug. 19, 2010

(65) Prior Publication Data
US 2011/0292779 A1 Dec. 1, 2011

(30) Foreign Application Priority Data

Feb. 12, 2009 (JP) .................. 2009-029448

(51) Int. Cl.
*G11B 5/58* (2006.01)
*G11B 7/00* (2006.01)

(52) U.S. Cl.
USPC ...................................... 369/53.2; 369/44.23

(58) Field of Classification Search
None
See application file for complete search history.

(56) References Cited

U.S. PATENT DOCUMENTS

| 2004/0013067 A1 | 1/2004 | Lee et al. |
| 2004/0095860 A1 | 5/2004 | Ariyoshi et al. |
| 2005/0213480 A1* | 9/2005 | Yamaoka et al. ........... 369/275.3 |
| 2006/0098558 A1 | 5/2006 | Kobayashi et al. |
| 2006/0280082 A1* | 12/2006 | Yasukawa ..................... 369/53.2 |
| 2007/0076548 A1* | 4/2007 | Maegawa .................... 369/47.31 |

(Continued)

FOREIGN PATENT DOCUMENTS

| JP | 11-238297 A | 8/1999 |
| JP | 2003-346379 A | 12/2003 |

(Continued)

OTHER PUBLICATIONS

International Search Report for corresponding International Application No. PCT/JP2010/000478 mailed Mar. 2, 2011.

(Continued)

*Primary Examiner* — Joseph Feild
*Assistant Examiner* — Carl Adams
(74) *Attorney, Agent, or Firm* — Renner, Otto, Boisselle & Sklar, LLP

(57) ABSTRACT

The present invention provides a method for determining what group a given multilayer optical disc belongs to. The disc is one of a number of multilayer optical discs, which are designed so that information stored is retrievable from any of the discs by irradiating the disc with a light beam having the same wavelength and which have been classified into multiple groups. According to this method, performed first is Step (A) of measuring either a distance from a first one of multiple information layers of the given multilayer optical disc to a second one thereof, which is located adjacent to the first information layer, or a distance from the first information layer to the surface of the optical disc. Next, Step (B) of determining, by the distance measured, what group the given multilayer optical disc belongs to is performed.

8 Claims, 28 Drawing Sheets

(56) References Cited

U.S. PATENT DOCUMENTS

| | | | |
|---|---|---|---|
| 2008/0151701 A1* | 6/2008 | Park et al. | 369/13.53 |
| 2008/0247291 A1* | 10/2008 | Kawaguchi | 369/53.23 |
| 2009/0290463 A1 | 11/2009 | Kuze et al. | |
| 2011/0292779 A1* | 12/2011 | Watanabe et al. | 369/53.2 |

FOREIGN PATENT DOCUMENTS

| | | |
|---|---|---|
| JP | 2004-171635 A | 6/2004 |
| JP | 2005-531872 A | 10/2005 |
| JP | 2006-344268 A | 12/2006 |
| JP | 2007-141347 A | 6/2007 |
| JP | 2008-165904 A | 7/2008 |
| WO | 2008/099590 A1 | 8/2008 |

OTHER PUBLICATIONS

Form PCT/ISA/237 for International Application No. PCT/JP2010/000478 dated Mar. 2, 2011 and Partial English translation.

Notice of Reasons for Rejection issued on Jul. 23, 2013 for corresponding Japanese Patent Application No. 2010-550433 (and partial translation).

\* cited by examiner

FIG.10

| GROUP 1 | LP=25 | GROUP 1 | LP=10 | GROUP 2 | LP=6.25 | GROUP 3 | LP=5 |
|---|---|---|---|---|---|---|---|
| DOUBLE-LAYER BD | | QUADRUPLE-LAYER | | SIX-LAYER AND EIGHT-LAYER BDs | | TEN-LAYER THROUGH SIXTEEN-LAYER BDs | |
| 1 | 100 | 1 | 100 | 1 | 100 | 1 | 100 |
| 2 | 75 | 2 | 90 | 2 | 93.75 | 2 | 95 |
| | | 3 | 80 | 3 | 87.5 | 3 | 90 |
| | | 4 | 70 | 4 | 81.25 | 4 | 85 |
| | | | | 5 | 75 | 5 | 80 |
| | | | | 6 | 68.75 | 6 | 75 |
| | | | | 7 | 62.5 | 7 | 70 |
| | | | | 8 | 56.25 | 8 | 65 |
| | | | | | | 9 | 60 |
| | | | | | | 10 | 55 |
| | | | | | | 11 | 50 |
| | | | | | | 12 | 45 |
| | | | | | | 13 | 40 |
| | | | | | | 14 | 35 |
| | | | | | | 15 | 30 |
| | | | | | | 16 | 25 |

FIG.11

| GROUP 1 LP=25 DOUBLE-LAYER BD | | GROUP 1 LP=8 AND 10 QUADRUPLE-LAYER | | GROUP 2 LP=5.75 AND 6.25 SIX-LAYER AND EIGHT-LAYER BDs | | GROUP 3 LP=4 AND 5 TEN-LAYER THROUGH SIXTEEN-LAYER BDs | |
|---|---|---|---|---|---|---|---|
| 1 | 100 | 1 | 100 | 1 | 100 | 1 | 100 |
| 2 | 75 | 2 | 90 | 2 | 93.75 | 2 | 95 |
| | | 3 | 82 | 3 | 88 | 3 | 91 |
| | | 4 | 72 | 4 | 81.75 | 4 | 86 |
| | | | | 5 | 76 | 5 | 82 |
| | | | | 6 | 69.75 | 6 | 77 |
| | | | | 7 | 64 | 7 | 73 |
| | | | | 8 | 57.75 | 8 | 68 |
| | | | | | | 9 | 64 |
| | | | | | | 10 | 59 |
| | | | | | | 11 | 55 |
| | | | | | | 12 | 50 |
| | | | | | | 13 | 46 |
| | | | | | | 14 | 41 |
| | | | | | | 15 | 37 |
| | | | | | | 16 | 32 |

FIG. 12

| GROUP 1 | LP=25 | GROUP 1 | LP=12.5 | GROUP 2 | LP=6.25 | GROUP 3 | LP=3.125 |
|---|---|---|---|---|---|---|---|
| DOUBLE-LAYER BD | | QUADRUPLE-LAYER | | SIX-LAYER AND EIGHT-LAYER BDs | | TEN-LAYER THROUGH SIXTEEN-LAYER BDs | |
| 1 | 100 | 1 | 100 | 1 | 100 | 1 | 100 |
| 2 | 75 | 2 | 87.5 | 2 | 93.75 | 2 | 96.875 |
| | | 3 | 75 | 3 | 87.5 | 3 | 93.75 |
| | | 4 | 62.5 | 4 | 81.25 | 4 | 90.625 |
| | | | | 5 | 75 | 5 | 87.5 |
| | | | | 6 | 68.75 | 6 | 84.375 |
| | | | | 7 | 62.5 | 7 | 81.25 |
| | | | | 8 | 56.25 | 8 | 78.125 |
| | | | | | | 9 | 75 |
| | | | | | | 10 | 71.875 |
| | | | | | | 11 | 68.75 |
| | | | | | | 12 | 65.625 |
| | | | | | | 13 | 62.5 |
| | | | | | | 14 | 59.375 |
| | | | | | | 15 | 56.25 |
| | | | | | | 16 | 53.125 |

FIG.13

| GROUP 1 | LP=25 | GROUP 1 | LP=10 AND 12.5 | GROUP 2 | LP=6 AND 6.25 | GROUP 3 | LP=3 AND 3.125 |
|---|---|---|---|---|---|---|---|
| DOUBLE-LAYER BD | | QUADRUPLE-LAYER | | SIX-LAYER AND EIGHT-LAYER BDs | | TEN-LAYER THROUGH SIXTEEN-LAYER BDs | |
| 1 | 100 | 1 | 100 | 1 | 100 | 1 | 100 |
| 2 | 75 | 2 | 87.5 | 2 | 93.75 | 2 | 96.875 |
| | | 3 | 77.5 | 3 | 87.75 | 3 | 93.875 |
| | | 4 | 65 | 4 | 81.5 | 4 | 90.75 |
| | | | | 5 | 75.5 | 5 | 87.75 |
| | | | | 6 | 69.25 | 6 | 84.625 |
| | | | | 7 | 63.25 | 7 | 81.625 |
| | | | | 8 | 57 | 8 | 78.5 |
| | | | | | | 9 | 75.5 |
| | | | | | | 10 | 72.375 |
| | | | | | | 11 | 69.375 |
| | | | | | | 12 | 66.25 |
| | | | | | | 13 | 63.25 |
| | | | | | | 14 | 60.125 |
| | | | | | | 15 | 57.125 |
| | | | | | | 16 | 54 |

FIG. 14

| No. | GROUP 1 (SLP=75) DOUBLE-LAYER | GROUP 2 (SLP=55) | | GROUP 3 (SLP=35) | | | | GROUP 4 (SLP=20) | | |
|---|---|---|---|---|---|---|---|---|---|---|
| | | TRIPLE-LAYER | QUADRUPLE-LAYER | SIX-LAYER | SEVEN-LAYER | EIGHT-LAYER | TEN-LAYER | FOURTEEN-LAYER | SIXTEEN-LAYER |
| 1 | 100 | 100 | 100 | 100 | 100 | 100 | 100 | 100 | 100 |
| 2 | 75 | 75 | 84 | 84 | 90 | 92 | 92 | 95 | 96 |
| 3 | | 55 | 65 | 65 | 75 | 77 | 77 | 88 | 90 |
| 4 | | | 55 | 55 | 65 | 70 | 70 | 82 | 86 |
| 5 | | | | 40 | 57 | 60 | 60 | 77 | 80 |
| 6 | | | | 35 | 48 | 57 | 57 | 70 | 76 |
| 7 | | | | | 35 | 45 | 45 | 65 | 70 |
| 8 | | | | | | 35 | 35 | 58 | 66 |
| 9 | | | | | | | 28 | 53 | 60 |
| 10 | | | | | | | 20 | 48 | 56 |
| 11 | | | | | | | | 40 | 50 |
| 12 | | | | | | | | 35 | 44 |
| 13 | | | | | | | | 28 | 38 |
| 14 | | | | | | | | 20 | 32 |
| 15 | | | | | | | | | 25 |
| 16 | | | | | | | | | 20 |

FIG.15

| GROUP 1 (LP=25) | | GROUP 2 (LP=12.5) | | | GROUP 3 (LP=6.25) | | | | GROUP 4 (LP=3.125) | | | |
|---|---|---|---|---|---|---|---|---|---|---|---|---|
| No. | DOUBLE-LAYER | No. | TRIPLE-LAYER | QUADRUPLE-LAYER | No. | SIX-LAYER | SEVEN-LAYER | EIGHT-LAYER | No. | TEN-LAYER | FOURTEEN-LAYER | SIXTEEN-LAYER |
| 1 | 100 | 1 | 100 | 100 | 1 | 100 | 100 | 100 | 1 | 100 | 100 | 100 |
| 2 | 75 | 2 | 87.5 | 87.5 | 2 | 93.75 | 93.75 | 93.75 | 2 | 96.875 | 96.875 | 96.875 |
| | | 3 | 75 | 75 | 3 | 87.5 | 87.5 | 87.5 | 3 | 93.75 | 93.75 | 93.75 |
| | | 4 | | 62.5 | 4 | 81.25 | 81.25 | 81.25 | 4 | 90.625 | 90.625 | 90.625 |
| | | | | | 5 | 75 | 75 | 75 | 5 | 87.5 | 87.5 | 87.5 |
| | | | | | 6 | 68.75 | 68.75 | 68.75 | 6 | 84.375 | 84.375 | 84.375 |
| | | | | | 7 | | | 62.5 | 7 | 81.25 | 81.25 | 81.25 |
| | | | | | 8 | | | 56.25 | 8 | 78.125 | 78.125 | 78.125 |
| | | | | | | | | | 9 | | 75 | 75 |
| | | | | | | | | | 10 | 71.875 | 71.875 | 71.875 |
| | | | | | | | | | 11 | | 68.75 | 68.75 |
| | | | | | | | | | 12 | | 65.625 | 65.625 |
| | | | | | | | | | 13 | | 62.5 | 62.5 |
| | | | | | | | | | 14 | | 59.375 | 59.375 |
| | | | | | | | | | 15 | | | 56.25 |
| | | | | | | | | | 16 | | | 53.125 |

FIG.16

| GROUP 1 (LP=25) | | GROUP 2 (LP=12.5) | | | GROUP 3 (LP=6.25) | | | | GROUP 4 (LP=3.125) | | | |
|---|---|---|---|---|---|---|---|---|---|---|---|---|
| No. | DOUBLE-LAYER | No. | TRIPLE-LAYER | QUADRUPLE-LAYER | No. | SIX-LAYER | SEVEN-LAYER | EIGHT-LAYER | No. | TEN-LAYER | FOURTEEN-LAYER | SIXTEEN-LAYER |
| 1 | 100 | 1 | 100 | 100 | 1 | 100 | 100 | 100 | 1 | 100 | 100 | 100 |
| 2 | 75 | 2 | 87.5 | 87.5 | 2 | 93.75 | 93.75 | 93.75 | 2 | 97 | 97 | 97 |
| | | 3 | 75 | 75 | 3 | 87.5 | 87.5 | 87.5 | 3 | 93.75 | 93.75 | 93.75 |
| | | 4 | | 62.5 | 4 | 81.25 | 81.25 | 81.25 | 4 | 90.75 | 90.75 | 90.75 |
| | | | | | 5 | 75 | 75 | 75 | 5 | 87.5 | 87.5 | 87.5 |
| | | | | | 6 | 68.75 | 68.75 | 68.75 | 6 | 84.5 | 84.5 | 84.5 |
| | | | | | 7 | | | 62.5 | 7 | 81.25 | 81.25 | 81.25 |
| | | | | | 8 | | | 56.25 | 8 | 78.25 | 78.25 | 78.25 |
| | | | | | | | | | 9 | 75 | | 75 |
| | | | | | | | | | 10 | 72 | | 72 |
| | | | | | | | | | 11 | | 68.75 | 68.75 |
| | | | | | | | | | 12 | | 65.75 | 65.75 |
| | | | | | | | | | 13 | | 62.5 | 62.5 |
| | | | | | | | | | 14 | | 59.5 | 59.5 |
| | | | | | | | | | 15 | | | 56.25 |
| | | | | | | | | | 16 | | | 53.25 |

FIG.21

|  | GROUP 1 | GROUP 2 | GROUP 3 | |
|---|---|---|---|---|
|  | SINGLE-LAYER BD | DOUBLE-LAYER BD | TRIPLE-LAYER BD | QUADRUPLE-LAYER BD |
| L0 | 100 μm ±5 (IN>OUT) | 100 μm ±5 (IN>OUT) | 100 μm ±5 (IN>OUT) | 100 μm ±5 (IN>OUT) |
| L1 | — | 75 μm ±5 (OUT>IN) | 75 μm ±5 (OUT>IN) | 84.5 μm ±5 (OUT>IN) |
| L2 | — | — | 57 μm ±5 (IN>OUT) | 65 μm ±5 (IN>OUT) |
| L3 | — | — | — | 54.5 μm ±5 (OUT>IN) |

FIG.22

| | CAPACITY | CAPACITOR PER LAYER | TRANSFER RATE (1x) | LINEAR VELOCITY | NUMBER OF REVOLUTIONS AT R=25 mm | WOBBLE FREQUENCY |
|---|---|---|---|---|---|---|
| SINGLE-LAYER | 25GB | 25GB | 36Mbps | 4.917m/s | 1880rpm | 956.522Hz |
| DOUBLE-LAYER | 50GB | 25GB | 36Mbps | 4.917m/s | 1880rpm | 956.522Hz |
| TRIPLE-LAYER | 100GB | 33GB | 36Mbps | 3.725m/s | 1424rpm | 956.522Hz |
| QUAD-RUPLE-LAYER | 128GB | 32GB | 36Mbps | 3.841m/s | 1468rpm | 956.522Hz |

FIG.26

| | TRIPLE-LAYER | | QUADRUPLE-LAYER | |
|---|---|---|---|---|
| | LAYER'S DEPTH (AND SPIRAL DIRECTION) | DISTANCE FROM LOWER ADJACENT LAYER | LAYER'S DEPTH (AND SPIRAL DIRECTION) | DISTANCE FROM LOWER ADJACENT LAYER |
| L0 | 100 μm ±5 (IN>OUT) | 25 μm | 100 μm ±5 (IN>OUT) | 15.5 μm |
| L1 | 75 μm ±5 (OUT>IN) | 18 μm | 84.5 μm ±5 (OUT>IN) | 19.5 μm |
| L2 | 57 μm ±5 (IN>OUT) | — | 65 μm ±5 (IN>OUT) | 10.5 μm |
| L3 | — | — | 54.5 μm ±5 (OUT>IN) | — |

METHOD FOR IDENTIFYING GROUP OF MULTILAYER DISC, AND OPTICAL DISC DEVICE

TECHNICAL FIELD

The present invention relates to an optical disc drive for reading or writing data from/on an optical disc that can be used as a multilayer disc, and more particularly relates to an optical disc drive for determining an optical disc loaded to be either a conventional single- and double-layer disc, or any of a variety of multilayer discs that can have up to as many as 16 or 20 layers, during the disc loading process.

BACKGROUND ART

In optical disc technologies, data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits and tracks and the thickness of the recording material film are both smaller than the thickness of the optical disc substrate. For that reason, those portions of the optical disc, where data is stored, define a two-dimensional plane, which is sometimes called a "storage plane" or an "information plane". However, considering that such a plane actually has a physical dimension in the depth direction, too, the term "storage plane (or information plane)" will be replaced herein by another term "information layer" or simply "layer". Every optical disc has at least one such information layer. Optionally, a single information layer may actually include a plurality of layers such as a phase-change material layer and a reflective layer.

In this description, an optical disc with a stack of N information layers (where N is an integer that is equal to or greater than two) will be referred to herein as an "N-layer disc". Also, optical discs, each having multiple information layers, will be collectively referred to herein as "multilayer discs", while an optical disc with only one information layer will be referred to herein as a "single-layer disc".

In a multilayer disc, the distance as measured from its disc surface, through which the incoming light enters the disc, to any of its information layers is sometimes called the "depth" of that information layer. Also provided between the shallowest information layer of a multilayer optical disc and its disc surface is a transparent cover layer, which is often called a "light-transmissive layer". Even though actually there is a light-transmissive layer between each pair of information layers, the "light-transmissive layer" will always refer herein to such a cover layer unless stated otherwise.

To read data that is stored on an optical disc or to write data on a recordable optical disc, the light beam always needs to maintain a predetermined converging state on a target track on an information layer. For that purpose, a "focus control" and a "tracking control" need to be done. The "focus control" means controlling the position of an objective lens along a normal to the surface of the information plane (such a direction will sometimes be referred to herein as "substrate depth direction") so that the focal point (or at least the converging point) of the light beam is always located on the information layer. On the other hand, the "tracking control" means controlling the position of the objective lens along the radius of a given optical disc (which direction will be referred to herein as "disc radial direction") so that the light beam spot is always located right on a target track.

In order to perform such a focus control or a tracking control, the focus error or the tracking error needs to be detected based on the light that has been reflected from the optical disc and the position of the light beam spot needs to be adjusted so as to reduce the error as much as possible. The magnitudes of the focus error and the tracking error are represented by a "focus error (FE) signal" and a "tracking error (TE) signal", both of which are generated based on the light that has been reflected from the optical disc.

In a conventional optical disc drive disclosed in Patent Document No. 1, if the disc loaded is a multilayer disc, two known spherical aberrations are set in advance, a focus search operation is performed with each of these two settings, and this series of operations are repeatedly performed until the numbers of FE signal detected with a predetermined threshold value agree with each other as shown in the flowchart illustrated in FIG. 10 of Patent Document No. 1. And the optical disc drive makes a decision that the largest numbers of FE signals that perfectly agree with each other should be the number of layers in the disc loaded. As a result, the deterioration in FE signal detection accuracy due to the influence of spherical aberration or astigmatism that has been caused by an uneven thickness of a Blu-ray Disc that requires as large an NA as 0.85 can be reduced and the accuracy can rather be increased by counting FE signals with respect to a given multilayer disc.

On the other hand, Patent Document No. 2 discloses an arrangement including, as an additional component, a focus detection system that can detect an FE signal with respect to the center of a light beam and another FE signal with respect to a peripheral portion of the light beam surrounding that center portion independently of each other, as shown in FIG. 3 of Patent Document No. 2. With such an arrangement, a spherical aberration signal can be generated as a differential signal representing the difference between the center and peripheral portions. Furthermore, a spherical aberration correction value, at which the spherical aberration signal has a zero voltage value (i.e., causes a polarity inversion) when the spherical aberration corrector is driven with respect to each of multiple layers of a multilayer disc, is stored in advance in a memory. That is to say, Patent Document No. 2 discloses a method for determining on which of a number of layers of a given multilayer disc the focus search operation has gotten done by actually loading the drive with the multilayer disc, setting a focus on one of its layers, driving the spherical aberration corrector so that the spherical aberration becomes zero at that layer on which the focus has been set, and then comparing the correction value to the value stored in the memory.

CITATION LIST

Patent Literature

Patent Document No. 1: Japanese Patent Application Laid-Open Publication No. 2006-344268

Patent Document No. 2: Japanese Patent Application Laid-Open Publication No. 2004-171635

SUMMARY OF INVENTION

Technical Problem

According to the conventional technique disclosed in Patent Document No. 1, every time the spherical aberrations are changed from one value into the other, a focus search operation is carried out. The number of FE signals (i.e., S-curve signals) detected during the focus search operation is counted. And the same series of operations are carried out a number of times until S-curves in two different states agree with each other. That is why such a technique should be effectively applicable to a triple- or quadruple-layer BD, which can have a layer-to-layer pitch close to 25 µm (of a double-layer BD) that is the same as that of a conventional BD. As for a multilayer disc with as many as eight or even sixteen layers, it is difficult to stack that many number of information layers one upon the other within as narrow a layer-to-layer pitch as 25 µm of a double-layer BD. For that reason, unless the light-transmissive layer (i.e., the cover layer) is even thinner than that of a double-layer BD (which has a thickness of 75 µm), it is difficult to stack as many as eight or sixteen layers in a single disc.

That is why in a multilayer disc with a lot of layers, the difference in depth between the information layer that is located closest to the disc surface (which will be referred to herein as the "shallowest layer") and the information layer that is located most distant from the disc surface widens so much that it is difficult to make the numbers of FE signals agree with each other with two or more spherical aberrations set. Furthermore, even if the largest possible number of layer could be stacked one upon the other within as narrow a layer-to-layer interval as 25 µm of a double-layer BD currently available, their layer-to-layer pitch should be so small that crosstalk would be inevitably produced between those layers. But if the reflectances of the respective layers were decreased in order to reduce that interlayer crosstalk, then the FE signals would be detected with even lower sensitivity. Consequently, the accuracy of detection would decrease significantly.

On the other hand, according to the conventional technique disclosed in Patent Document No. 2, an additional photodetector and an extra preamplifier are needed to detect the spherical aberration signal, thus complicating the arrangement of the optical pickup overly and interfering with its downsizing or cost reduction. On top of that, since the reflected light needs to be split into two and the peripheral portion of the light needs to be guided to a photodetector for detecting a spherical aberration, the intensity of the light striking the main photodetector that detects an RF signal will decrease. As a result, in performing a read operation on a multilayer disc that has a low reflectance, the SNR of the RF signal obtained would decrease in such a situation, which is not beneficial.

It is therefore an object of the present invention to provide a method for determining what group a given multilayer disc (such as a multilayer BD) belong to, by which the group and the number of layers of the disc loaded can be determined by a simple scheme, and also provide an optical disc drive that makes such a decision.

Solution to Problem

A multilayer optical disc's group determining method according to the present invention is a method for determining what group a given multilayer optical disc belongs to. The given multilayer optical disc is one of a number of multilayer optical discs, which are designed so that information stored is retrievable from any of the discs by irradiating the disc with a light beam having the same wavelength and which have been classified into multiple groups. The method includes the steps of: (A) measuring either a distance from a first one of multiple information layers of the given multilayer optical disc to a second one thereof, which is located adjacent to the first information layer, or a distance from the first information layer to the surface of the optical disc; and (B) determining, by the distance measured, what group the given multilayer optical disc belongs to.

In one preferred embodiment, the step (A) includes the steps of: adjusting the light beam so as to make a spherical aberration correction to such a degree that is set for the first information layer of the given multilayer optical disc; shifting the point of convergence of the light beam perpendicularly to the surface of the multilayer optical disc while irradiating the optical disc with the adjusted light beam; and determining the distance from the surface of the optical disc to the first information layer by a difference between a first irradiation condition on which the point of convergence of the light beam is located on the surface of the optical disc and a second irradiation condition on which the point of convergence is located on the first information layer.

In another preferred embodiment, the first information layer is located closer to the light incident surface of the multilayer optical disc than any other layer thereof is.

In still another preferred embodiment, the step (A) includes the steps of: adjusting the light beam so as to make a spherical aberration correction to a first degree that is set for the first information layer of the given multilayer optical disc; irradiating the multilayer optical disc that has been loaded into an optical disc drive with the adjusted light beam and changing the magnitude of the spherical aberration correction to make on the light beam into a second degree so that a focus error signal or a tracking error signal has the maximum amplitude on the first information layer; and determining, by the second degree of the spherical aberration correction, the distance from the surface of the multilayer optical disc that has been loaded into the optical disc drive to the first information layer thereof.

A method for distinguishing a given multilayer optical disc according to the present invention includes the steps of: (X) determining what group the multilayer optical disc that has been loaded into an optical disc drive belongs to by a multilayer disc's group finding method according to any of the preferred embodiments of the present invention described above; and (Y) irradiating one of the information layers of the multilayer optical disc and determining, by the light beam that has been reflected from the information layer, how many information layers the multilayer optical disc has.

In one preferred embodiment, the step (Y) includes the steps of: retrieving address information from one of the information layers that is located closer to the surface of the optical disc than any other layer is; and determining, by reference to the address information, how many information layers the multilayer optical disc has.

In still another preferred embodiment, the step (Y) includes the steps of: setting the magnitude of spherical aberration correction to be the first degree that is associated with one of the information layers of a first candidate multilayer optical disc, which is located closer to the surface of the optical disc than any other layer thereof is, the first candidate multilayer optical disc being one of a number of multilayer optical discs that belong to the same group; irradiating that information layer of the multilayer optical disc loaded, which is located closest to the surface of the optical disc, with a light beam, for which the magnitude of spherical aberration correction has been set to be the first degree, thereby obtaining a first tracking error signal; setting the magnitude of spherical aberration correction to be the second degree that is associated with one of the information layers of a second candidate multilayer optical disc, which is located closer to the surface of the optical disc than any other layer thereof is, the second candidate multilayer optical disc being another one of a number of multilayer optical discs that belong to the same group; irradiating that information layer of the multilayer optical disc loaded, which is located closest to the surface of the optical disc, with a light beam, for which the magnitude of spherical aberration correction has been set to be the second degree, thereby obtaining a second tracking error signal; and if the first tracking error signal has a greater amplitude than the second tracking error signal, determining the multilayer optical disc loaded to be the first candidate multilayer optical disc; but if the second tracking error signal has a greater amplitude than the first tracking error signal, determining the multilayer optical disc loaded to be the second candidate multilayer optical disc.

In yet another preferred embodiment, if one group, to which the multilayer optical disc that has been loaded into an optical disc drive belongs, includes N-layer optical discs, each having N information layers (where N is an integer that is equal to or greater than three), and (N+1)-layer optical discs, each having (N+1) information layers, the step (Y) includes the step of detecting the direction of a spiral pattern that is formed by tracks on one of the information layers of the multilayer optical disc that has been loaded into the optical disc drive, the information layer being located closer to the surface of the optical disc than any other information layer thereof is. It is determined, by the direction of the spiral pattern that is formed by the tracks, how many information layers the multilayer optical disc that has been loaded into the optical disc drive has.

Another optical disc distinguishing method according to the present invention is a method for distinguishing, from each other, a single-layer BD, a double-layer BD, a triple-layer BD and a quadruple-layer BD, all of which have a reference layer at the same depth under their disc surface. The method includes the steps of: setting the number of revolutions of an optical disc loaded to be a value that is associated with the single- and double-layer BDs, a value that is associated with the triple-layer BD, or a value that is associated with the quadruple-layer BD; getting a PLL locked on the reference layer of the optical disc, thereby determining which of first, second and third groups the optical disc loaded belongs to, wherein the first group is comprised of a single-layer BD, the second group is comprised of a double-layer BD, and the third group is comprised of triple- and quadruple-layer BDs; and if the optical disc has turned out to belong to the third group, determining whether the optical disc loaded is a triple-layer BD or a quadruple-layer BD.

Another optical disc distinguishing method according to the present invention is a method for distinguishing an N-layer optical disc having N information layers (where N is an integer that is equal to or greater than three) from an (N+1)-layer optical disc having (N+1) information layers. The method includes the steps of: irradiating a particular information layer of an optical disc loaded with a light beam; detecting the direction of a spiral pattern that is formed by tracks on the particular information layer; and determining, by the direction of the spiral pattern that is formed by the tracks, whether the optical disc loaded is an N-layer optical disc or an (N+1)-layer optical disc.

An optical disc drive according to the present invention can read data from a given one of a number of multilayer optical discs, which are designed so that information stored is retrievable from any of the discs by irradiating the disc with a light beam having the same wavelength and which have been classified into multiple groups. The drive includes: a motor for rotating the given multilayer optical disc; a light source for emitting the light beam with the wavelength; an objective lens for converging the light beam; a photodetector section for detecting the light beam that has been reflected from the optical disc; a mechanism for adjusting the degree of convergence of the light beam; and a control section for detecting, based on the output of the photodetector section, either a distance between at least two of the information layers of the optical disc or a distance from one of the information layers to the surface of the optical disc, thereby determining, by the distance, what group the given optical disc belongs to.

Another optical disc drive according to the present invention can read data from a given one of a number of multilayer optical discs, which are designed so that information stored is retrievable from any of the discs by irradiating the disc with a light beam having the same wavelength and which have been classified into multiple groups. The drive includes: a motor for rotating the given multilayer optical disc; a light source for emitting the light beam with the wavelength; an objective lens for converging the light beam; a photodetector section for detecting the light beam that has been reflected from the optical disc; a mechanism for adjusting the degree of convergence of the light beam; and a control section for detecting, based on the output of the photodetector section, either a distance between at least two of the information layers of the optical disc or a distance from one of the information layers to the surface of the optical disc, thereby determining, by the distance, what group the given optical disc belongs to. The control section determines how many information layers the multilayer optical disc has.

Yet another optical disc drive according to the present invention can determine whether the optical disc loaded is an N-layer optical disc having N information layers (where N is an integer that is equal to or greater than three) or an (N+1)-layer optical disc having (N+1) information layers. The drive includes: a motor for rotating the given multilayer optical disc; a light source for emitting the light beam with the wavelength; an objective lens for converging the light beam; a photodetector section for detecting the light beam that has been reflected from the optical disc; a mechanism for adjusting the degree of convergence of the light beam; and a control section, which detects the direction of a spiral pattern that is formed by tracks on a particular information layer of the optical disc loaded by getting the particular information layer irradiated with a light beam, and which determines, by the direction of the spiral pattern that is formed by the tracks, whether the optical disc loaded is an N-layer optical disc or an (N+1)-layer optical disc.

Advantageous Effects of Invention

An optical disc drive according to the present invention measures either 1) the distance from the surface of a compatible multilayer disc loaded to the shallowest layer thereof or 2) the distance between two layers thereof, thereby classifying multilayer discs into a number of groups. If any of the groups thus formed consists of only one multilayer disc, then it is already known what group that multilayer disc belongs to.

However, if any of the groups thus formed includes a number of candidate multilayer discs, then the number of layers that the multilayer disc loaded has is determined by either the address information of its shallowest layer or some physical property such as the amplitude of a TE signal.

Thus, by detecting S-curve signals from only two minimum required layers with the spherical aberration almost optimized from the start, instead of counting S-curves of every layer, the optical disc drive of the present invention can determine the group and the number of layers of a given multilayer disc accurately without being affected by a difference in reflectance between respective layers or a variation in the amplitude of an S-curve according to the recorded or unrecorded state.

Furthermore, compared to the conventional drives that change spherical aberrations and perform focus searches a number of times, the drive of the present invention can distinguish the given disc in a much shorter time. On top of that, the drive of the present invention is much less affected by any variation in reflectance, not just a variation in spherical aberration, and therefore, can make a very accurate decision on not just quadruple- and six-layer discs but also sixteen- and twenty-layer discs and multilayer discs with even more layers. Consequently, significant effects are achieved by the present invention.

BRIEF DESCRIPTION OF DRAWINGS

FIG. 10 illustrates a first exemplary grouping pattern for multilayer BD discs.

FIG. 11 illustrates a second exemplary grouping pattern for multilayer BD discs.

FIG. 12 illustrates a third exemplary grouping pattern for multilayer BD discs.

FIG. 13 illustrates a fourth exemplary grouping pattern for multilayer BD discs.

FIG. 14 illustrates a fifth exemplary grouping pattern for multilayer BD discs.

FIG. 15 illustrates a sixth exemplary grouping pattern for multilayer BD discs.

FIG. 16 illustrates a seventh exemplary grouping pattern for multilayer BD discs.

FIG. 21 is a table summarizing the specifics of Groups 1, 2 and 3 according to fifth and sixth preferred embodiments of the present invention.

FIG. 22 is a table summarizing the specifications of conventional single-layer and double-layer discs and triple-layer and quadruple-layer discs according to the fifth and sixth preferred embodiments of the present invention.

FIG. 26 is a table summarizing the specifications of a triple-layer BD and a quadruple-layer BD.

DESCRIPTION OF EMBODIMENTS

Figure 1:
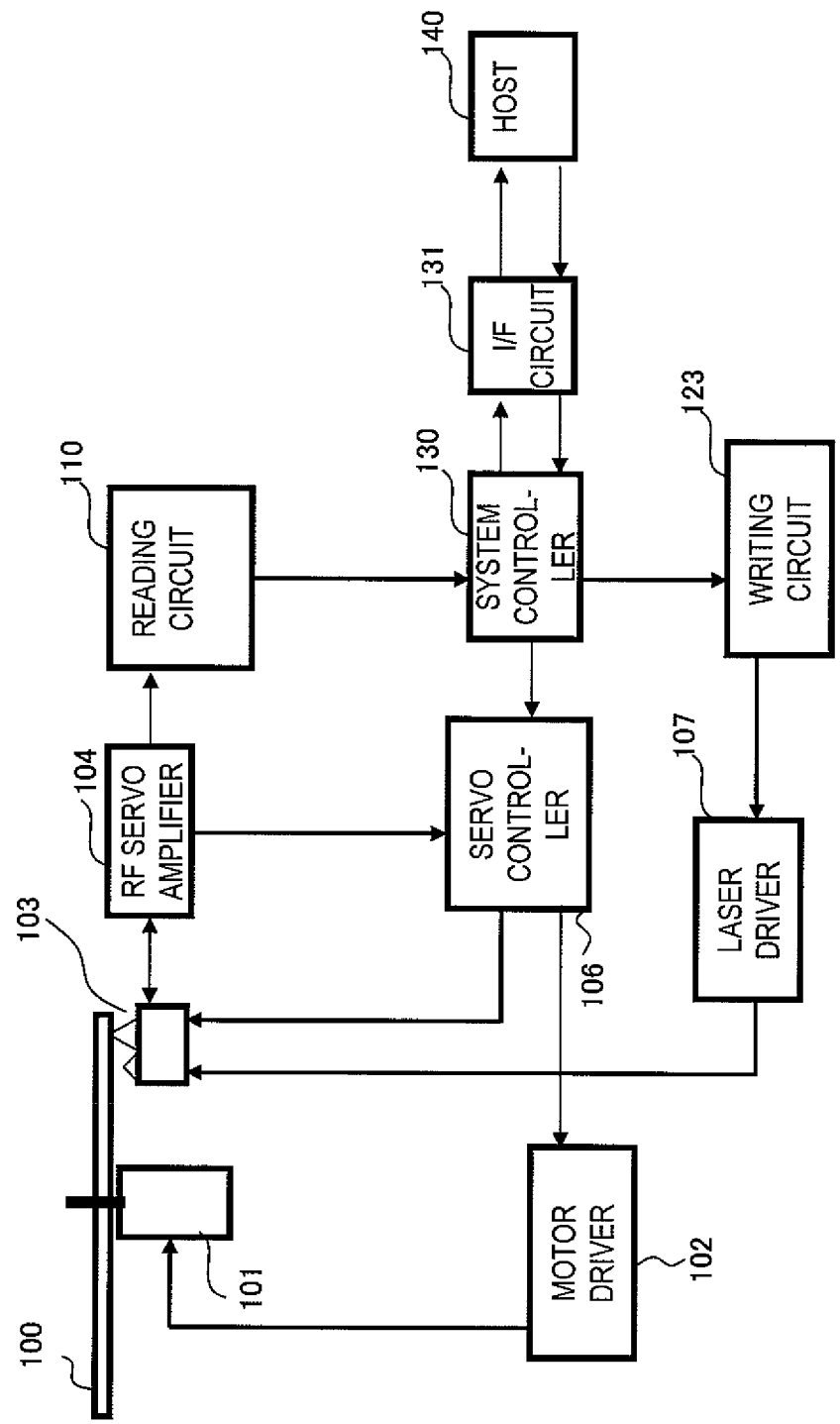
FIG. 1 is a block diagram illustrating a configuration for an optical disc drive according to the present invention.

The BD-RE (rewritable) standards were established in 2000 and then BD-R and BD-ROM standards were issued. In the case of BDs, standards were set from the beginning for not only single-layer discs (with a capacity of 25 GB) but also single-sided double-layer discs (with a capacity of 50 GB). The deeper one of the two information layers (i.e., so-called "L0 layer") of a double-layer BD has a depth of 0.1 mm (=100 µm), which is the same as the depth of the only information of a single-layer disc. On the other hand, the shallower information layer (i.e., so-called "L1 layer"), or the information layer that is located closer to the disc surface than the other layer, of a double-layer BD has a depth of 0.075 mm (=75 µm). In this case, the depth of the shallower layer is equal to the thickness of the cover layer.

Currently, in the field of BDs, multilayer discs that have three or more information layers that are stacked one upon the other are being researched and developed. To ensure compatibility with existent single- and double-layer BDs that have already been put on the market, it should be preferred that their reference information layer (i.e., L0 layer), which is the deepest one of their multiple information layers, also have a depth of 0.1 mm. If the arrangement of multiple information layers in a multilayer disc should be determined under that condition, there are the following two approaches:

1) set the layer-to-layer pitch to be less than 25 µm; and
2) set the depth of the shallowest layer (corresponding to the cover layer thickness) to be less than 0.075 mm (=75 µm).

As far as multilayer BDs are concerned, it is difficult to advance the research and development by leaps and bounds and establish the standards overnight all the way from triple or quadruple-layer BDs through huge-capacity BDs with as many as ten, sixteen or even twenty information layers. For that reason, ordinarily, it is a safe measure to take to upgrade the generations step by step, and release the update one by one, according to the users' needs or the market demand.

In view of these considerations, it is preferred that those single-, double- and multilayer discs be classified, on a generation (or phase) basis, into the group of single- and double-layer BDs that have already been put on the market, the group of triple- and quadruple-layer BDs that are going to go on the market anytime soon, and the group of eight- and ten-layer BDs that will go on the market in the near future. And it is also preferred that those three groups have their own layer-to-layer pitch and/or cover layer thickness so as to be easily distinguished from each other. By grouping multilayer optical discs in this manner, multilayer BDs that have already gone, or are soon going to go, on the market one generation after another can be dealt with flexibly without changing significantly the basic disc distinguishing algorithm.

Those groups preferably have one of the following features:

1) Every BD belong to the same group (or generation) needs to have substantially the same cover layer thickness (corresponding to the distance from the disc surface to their shallowest layer). In order to reduce the interlayer crosstalk, even optical discs belonging to the same group need to have their layer-to-layer distance adjusted according to their number of layers. And a group with a relatively large number of layers should have a narrower layer-to-layer pitch than a group with a relatively small number of layers; or 2) Every BD belonging to the same group (or generation) needs to have substantially the same layer-to-layer pitch. In that case, the larger the number of layers a group has, the smaller their cover layer thickness should be.

In Situation 1), respective groups need to have noticeably different cover layer thicknesses so that the group can be determined by the cover layer thickness.

On the other hand, in Situation 2), respective groups need to have appreciably varying layer-to-layer pitches so that the group can be determined by not so much the cover layer thickness as the layer-to-layer pitch.

As a result, the groups can be distinguished easily on a generation-by-generation basis. However, not all of the optical discs belonging to the same group need to have quite the same cover layer thickness or layer-to-layer pitch but their cover layer thicknesses or layer-to-layer pitches just need to be close to each other to the point that each group can be distinguished from the others. Also, one group may consist of only one kind of optical discs.

To determine the group of a given optical disc by either its cover layer thickness or layer-to-layer pitch, an optical disc drive needs to detect the cover layer thickness or the layer-to-layer pitch of that disc. For that purpose, the optical disc drive can irradiate either the surface or an information layer of the given optical disc with a light beam and can generate various signals based on its reflected light. And by using those signals, the optical disc drive can determine the cover layer thickness or the layer-to-layer pitch. For example, while the objective lens of an optical pickup is moved toward the optical disc, the FE signal comes to have an S-curve signal when the point of convergence of the light beam crosses each layer. And by measuring the time interval between the first and second S-curve signals, the distance that the objective lens has traveled can be calculated based on the time interval, and therefore, the cover layer thickness can be obtained. In the same way, the distance between two arbitrary adjacent layers (i.e., the layer-to-layer pitch) can also be calculated based on the interval at which the S-curve signals appear.

Alternatively, the cover layer thickness or the layer-to-layer pitch can also be obtained by a different method. For example, if the focus is set on the shallowest layer that is located closer to the disc surface than any other layer and if the spherical aberration is adjusted so that $TE_{max}$ or the read signal is optimized on that layer, then the cover layer thickness can be calculated based on the adjusted spherical aberration value.

Hereinafter, preferred embodiments of an optical disc drive according to the present invention will be described.

Embodiment 1

First of all, an Exemplary Configuration for an Optical disc drive compatible with multilayer discs as a first preferred embodiment of the present invention will be described. FIGS. 10 through 13 show specifically how a single-layer BD, a double-layer BD and other multilayer BDs with up to sixteen layers, which are compatible with the optical disc drive of this preferred embodiment, may be classified into respective groups along with their thickness and pitch data. FIG. 1 is a block diagram illustrating an optical disc drive as a first preferred embodiment of the present invention.

A multilayer disc may have any of various combinations of layers. However, considering compatibility with single- and double-layer BDs that have already been put on the market, it is preferred that the reference layer always have a constant depth of 100 μm.

If the interval between the layers were too narrow, then crosstalk would be produced between the layers. For that reason, the interval between the layers (which will be referred to herein as "layer pitch (LP)") is preferably at least 3 μm. Also, considering the influence of scratches and dust, the light-transmissive layer cannot be too thin (i.e., the distance from the disc surface to the shallowest layer cannot be too short). Considering that a BD requires as high an NA as 0.85, the layer pitch is preferably at least equal to 20 μm and more preferably 25 μm or more.

In view of these considerations, double-layer, quadruple-layer, six-layer, eight-layer, ten-layer, twelve-layer, fourteen-layer, and sixteen-layer discs could have an arrangement in any of the four patterns shown in FIG. 10, 11, 12 or 13. According to Patterns #1 and #2 shown in FIGS. 10 and 11, the interval between each pair of adjacent information layers is as broad as it can be. Specifically, in the example of Pattern #1, a regular interval is left between each pair of adjacent information layers. More specifically, in a sixteen-layer optical disc, the layer-to-layer interval becomes 5 μm and the distance from the surface to the shallowest information layer becomes 25 μm. On the other hand, in the example of Pattern #2, the layer-to-layer interval is changed alternately between two values to cancel the crosstalk phenomenon. In the sixteen-layer optical disc, the interval between an odd-numbered layer and an even-numbered layer becomes 5 μm, the interval between an even-numbered layer and an odd-numbered layer becomes 4 μm, and the distance from the surface to the shallowest information layer becomes 32 μm. Multilayer optical discs do not always have to be grouped as shown in FIGS. 10 to 13. Other examples will be described in detail later.

According to Patterns #3 and #4 shown in FIGS. 12 and 13, the distance from the disc surface to the shallowest layer (i.e., the thickness of the light-transmissive layer) is given a top priority. In the example of Pattern #3, a regular interval is left between each pair of adjacent layers. For instance, a sixteen-layer optical disc has a layer-to-layer interval of 3.125 μm and the distance from the disc surface to the shallowest layer is 53.125 μm. On the other hand, in the example of Pattern #4, the layer-to-layer interval is changed alternately between two values to cancel the crosstalk phenomenon. In the sixteen-layer optical disc, the interval between an odd-numbered layer and an even-numbered layer becomes 3.125 μm, the interval between an even-numbered layer and an odd-numbered layer becomes 3 μm, and the distance from the disc surface to the shallowest layer is 54 μm. These dimensions are actually somewhat greater or smaller than those exemplary values due to some variation in substrate thickness or a stacking error during the manufacturing process of the medium or due to a variation in layer-to-layer interval and the thickness of the light-transmissive layer. In the following description, only Pattern #1 shown in FIG. 10 will be described in detail and the other patterns #2, #3 and #4 will be described just complementarily as needed.

Hereinafter, it will be described with reference to FIG. 1 basically how the multilayer optical disc drive of this first preferred embodiment may operate. It should be noted that description of the same features as the prior art will be omitted herein.

This multilayer optical disc drive includes: an optical pickup 103 including an optical system for converging a light beam on the optical disc 100, a photodetector for detecting the light reflected from the optical disc and a laser diode as a light source; a motor driver 102 for driving an optical disc motor 101 so that the motor 101 runs at a predetermined number of revolutions; a servo controller 106 for controlling the operation of the optical pickup 103; a reading circuit 110 for reading an information signal that has been detected by the optical pickup 103 on the optical disc 100; and a writing circuit 123, which makes the laser driver 107 drive the laser diode and make the laser diode generate pulses of laser beams by a predetermined modulation method according to the information to be stored, thereby writing the information on the optical disc 100.

The optical pickup 103 irradiates the optical disc 100, which has been mounted on the optical disc motor 101, with a converged laser beam. An RF servo amplifier 104 generates an electrical signal based on the light that has been reflected from the optical disc 100. The servo controller 106 performs a focus control and a tracking control on the optical disc 100 that has been mounted on the optical disc motor 101. The servo controller 106 includes a disc distinguishing section 260 for determining, by irradiating the optical disc 100 with a light beam using the light source and lenses, whether the given optical disc 100 is a BD or not, and whether the disc 100 has only one layer, two layers, or more than two layers.

The reading circuit 110 gets the electrical signal, which has been supplied from the RF servo amplifier 104, equalized by a waveform equalizer, for example, thereby generating an analog read signal, which is converted into a digital signal and then synchronized with a read clock signal (i.e., a reference clock signal) by a PLL. In this manner, the data can be extracted. Thereafter, the data is subjected to predetermined demodulation and error correction and then supplied to a system controller 130, which transfers the data to a host 140 by way of an I/F circuit 131.

Then, the writing circuit 123 adds a header and redundant bits for error correction to the data, modulates it into a predetermined modulation pattern (by predetermined modulation method), and then gets pulsed laser beams emitted from the laser diode in the optical pickup 103 by the laser driver 107 in order to write the information that has been supplied from the host 140 by way of the I/F circuit 131 on the optical disc 100. By varying the reflectance of the recording material (such as an organic material or a phase change material) of the optical disc 100 according to the degree of intensity modulation of the laser beam that has been incident on the optical disc 100, information is written as ones or zeros.

Figure 2:
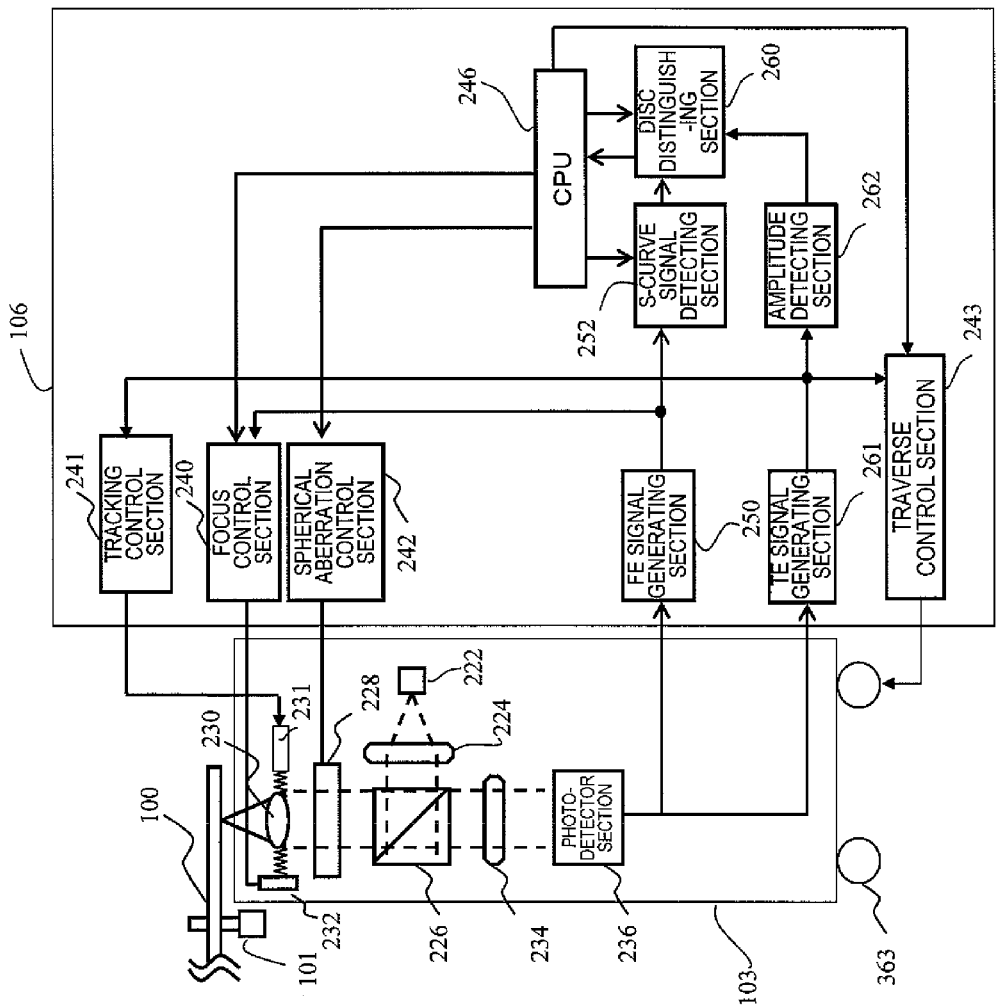
FIG. 2 illustrates, in further detail, the optical pickup 103, the servo controller 106 and their surrounding sections shown in FIG. 1.

FIG. 2 is a block diagram illustrating, in further detail, the optical pickup 103, the servo controller 106 and their surrounding sections shown in FIG. 1. Hereinafter, the present invention will be further described with reference to FIG. 2.

First of all, the configuration of the optical pickup will be described. The optical pickup 103 includes a light source 222, a coupling lens 224, a polarization beam splitter 226, a spherical aberration corrector 228, an objective lens 230, a tracking actuator 231, a focus actuator 232, a condenser lens 234 and a photodetector section 236.

The light source 222 may be a semiconductor laser diode that emits a light beam. In FIG. 2, only one light source 222 is illustrated for the sake of simplicity. However, the light source may actually be made up of three semiconductor laser diodes, which emit light beams with mutually different wavelengths. Specifically, the single optical pickup includes multiple semiconductor laser diodes for emitting light beams with mutually different wavelengths for CDs, DVDs and BDs, respectively.

The coupling lens 224 transforms the light beam that has been emitted from the light source 222 into a parallel light beam. The polarization beam splitter 226 reflects the parallel light beam that has come from the coupling lens 224. The position of the semiconductor laser diode to use in the light source 222 and the wavelength of the light beam emitted will change according to the type of the given optical disc. That is why the configuration of the best optical system also changes according to the type of the given optical disc 100. For that reason, the configuration of the actual optical pickup 103 is more complicated than the illustrated one.

The objective lens 230 converges the light beam that has been reflected from the polarization beam splitter 226.

The actuator 232 controls the position of the objective lens 230 in response to the FE and TE signals so that the objective lens 230 is always located at its predetermined position. In reading or writing data from/on a target one of the information layers of the optical disc 100, the focal point of the light beam that has been converged by the objective lens 230 is located on the target information layer, thereby forming a light beam spot on that information layer. In FIG. 2, only one objective lens 230 is illustrated. Actually, however, there are multiple objective lenses 230, one of which is selectively used according to the type of the given optical disc 100. When data is being read or written, focus servo and tracking servo controls are activated so that the focal point of the light beam follows the target tracks on the target information layer and the position of the objective lens 230 is controlled highly accurately.

This preferred embodiment is characterized by a method for determining the group and the number of layers of a given BD with an optical disc drive that performs a read/write operation on the optical disc 100 using the blue-violet laser diode 222 and the objective lens 230 with a high NA in combination. That is why the optical pickup is supposed to have such a simplified configuration as what is shown in FIG. 2 for the sake of simplicity. After the BD disc 100 has been loaded and before data starts to be read or written, a disc distinguishing operation is carried out to determine whether or not the BD loaded is a multilayer disc and how many layers the BD has if the answer is YES. When the disc distinguishing operation is performed, the objective lens 230 has its position changed significantly along its optical axis by the focus actuator 232.

The spherical aberration corrector 228 includes a correction lens (not shown) which can change its position in the optical axis direction, for example. And by adjusting the position of the correction lens, the degree of spherical aberration (i.e., the magnitude of correction) can be changed, which is a so-called "beam expander arrangement". However, the spherical aberration corrector 228 does not always have to have such a beam expander arrangement but may also have an arrangement for reducing the aberration by using a liquid crystal cell or a hinge.

The light beam that has been reflected from the target information layer of the BD disc 100 passes through the objective lens 230, the spherical aberration correcting section 228 and the polarization beam splitter 226 and then enters the condenser lens 234, which converges the light that has been reflected from the optical disc 100 and then passed through the objective lens 230 and the polarization beam splitter 226 on the photodetector section 236. In response, the photodetector section 236 receives the light that has been transmitted through the condenser lens 234 and converts the optical signal into various kinds of electrical signals (i.e., current signals). The photodetector section 236 may be a quadruple photodetector section with four photosensitive areas, for example.

The optical pickup 103 is driven by a traverse motor 363 so as to move over a wide radial range on the optical disc 100.

The servo controller 106 shown in FIG. 2 includes a focus control section 240, a tracking control section 241, a spherical aberration control section 242 and a traverse driver 243. Using these sections, the CPU 246 controls various kinds of operations to be performed by the optical pickup 130. The servo controller 106 further includes an FE signal generating section 250, an S-curve signal detecting section 252, a TE signal generating section 261, an amplitude detecting section 262, and the disc distinguishing section 260.

The focus control section 240 drives the focus actuator 232 in accordance with the instruction given by the CPU 246, thereby moving the objective lens 230 to any arbitrary position along the optical axis. Also, the focus control section 240 performs a focus control so that the light beam spot on the optical disc 100 has a predetermined converged state in response to the FE signal that has been supplied from the FE signal generating section 250.

On the other hand, the tracking control section 241 drives the tracking actuator 231, thereby moving the objective lens 230 to any radial location on the optical disc 100, and also performs a tracking control so that the light beam spot on the optical disc 100 follows the tracks in response to a TE signal supplied from the TE signal generating section 261.

The traverse controller 243 controls the traverse motor 363 in accordance with the outputs of the CPU 246 and the TE signal generating section 261, thereby moving the optical pickup 103 to a target radial location on the optical disc 100.

Figure 3:
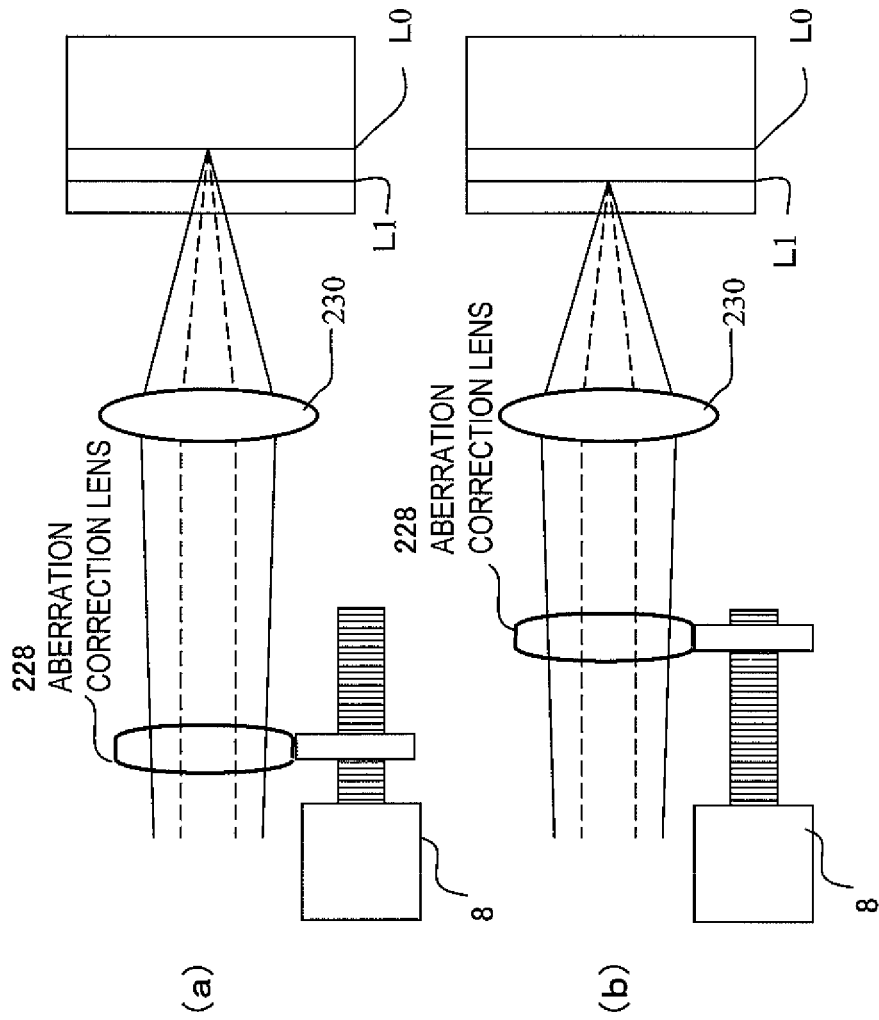
FIG. 3 illustrates a detailed arrangement of the spherical aberration correction section 228.

In accordance with the instruction given by the CPU, the spherical aberration control section 242 controls the spherical aberration correcting section 228 into a predetermined setting. Specifically, in response to the control signal supplied from the spherical aberration control section 242, the stepping motor 8 shown in FIG. 3 operates so as to displace the aberration correction lens 228 to a predetermined position, which is defined by the cover layer thickness of the first or second layer as for a double-layer disc, for example. By changing the position (i.e., the position in the optical axis direction) of the aberration correction lens 228, the spherical aberration state of the light beam can be regulated. The same operation or function can be done in a similar manner in any of the four- to sixteen-layer optical disc or even in a twenty-layer optical disc.

The FE signal generating section 250 generates an FE signal based on the electrical signals that have been supplied from multiple photosensitive areas of the photodetector section 236. The method of generating the FE signal is not particularly limited. Thus, the FE signal may be generated by an astigmatism method, a knife edge method or even a spot sized detection (SSD) method. The output FE signal of the FE signal generating section 250 is supplied to the S-curve signal detecting section 252, which sets a predetermined detection threshold value in accordance with the instruction given by the CPU.

The TE signal generating section 261 generates a TE signal based on the electrical signals that have been supplied from multiple photosensitive areas in the photodetector section 236. As for a recordable medium with land and groove tracks such as a BD-R or a BD-RE, the TE signal is usually generated by push-pull detection method. On the other hand, as for a read-only medium with embossed information pre-pits such as a BD-ROM, the TE signal is usually generated by phase difference detection method. However, the method of generating a TE signal is not particularly limited by any tracking method.

The TE signal generated by the TE signal generating section 261 is supplied to the amplitude detecting section 262, which measures and detects the amplitude of a signal that appears as a sinusoidal wave when a track is crossed at a predetermined spherical aberration setting.

The S-curve signal detecting section 252 determines whether or not the level of the FE signal exceeds a predetermined threshold value while the objective lens 230 is moving along the optical axis to make a focus search, thereby detecting an S-curve signal. According to this preferred embodiment, first of all, a spherical aberration value is set according to the depth of the multilayer BD disc's shallowest layer that has the smallest cover layer thickness in the compatible multilayer disc. Thereafter, with the objective lens raised from the lowest level, an S-curve signal representing the disc surface and another S-curve signal representing the information layer that is located closest to the disc surface (i.e., the shallowest layer) are detected by the S-curve signal detecting section 252. Then, the disc distinguishing section 260 compares a focus drive value (i.e., a height of the objective lens 230) when an S-curve signal representing the disc surface is detected to another focus drive value (i.e., a different lens height) when an S-curve signal representing the shallowest layer is detected. In this manner, the distance from the disc surface to the shallowest layer (which will be referred to herein as a surface layer pitch (SLP)) can be obtained. The distance from one information layer to its adjacent information layer (i.e., the layer-to-layer interval or pitch) can also be obtained in a similar manner.

Figure 4:
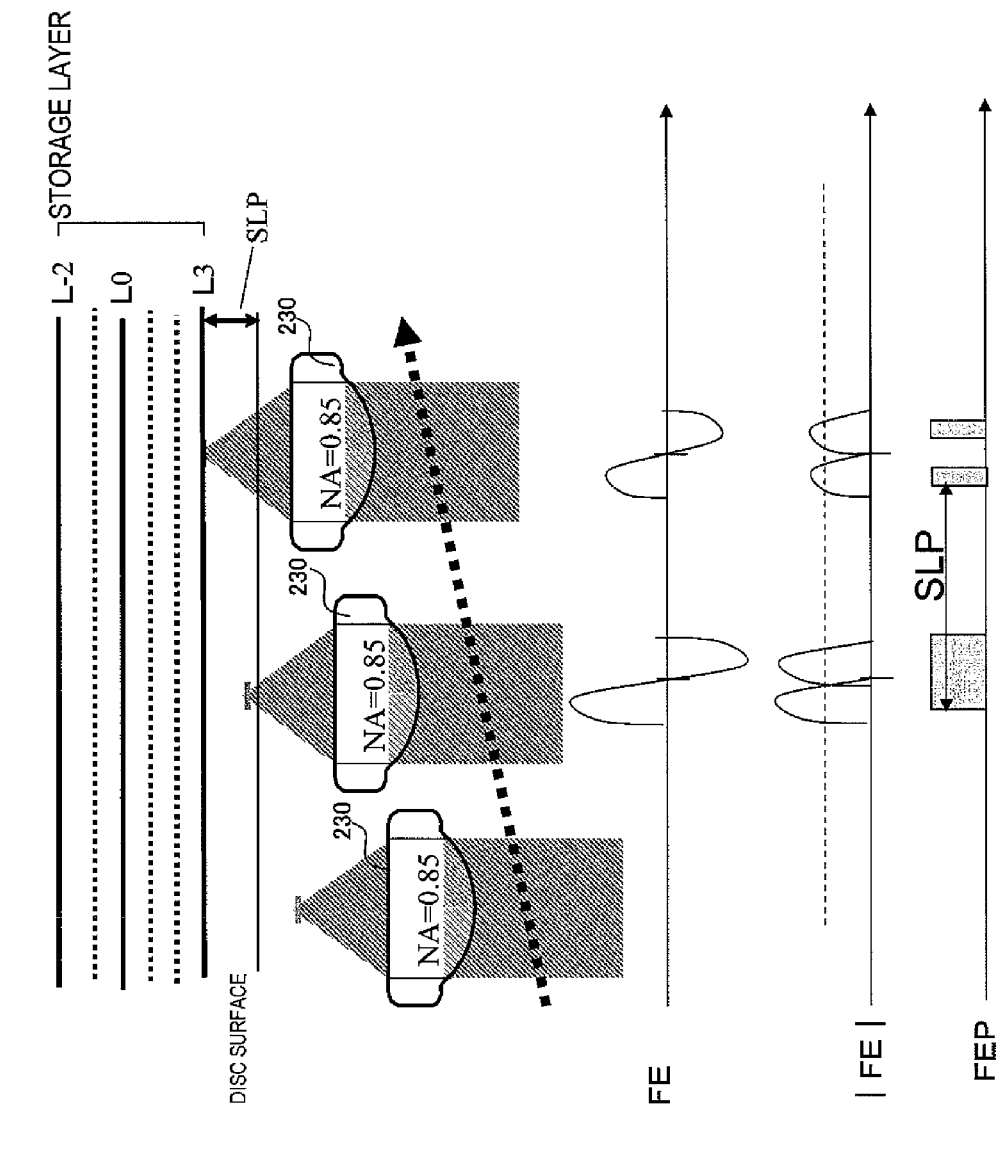
FIG. 4 is a schematic representation illustrating where the objective lens 230 passes during a focus search operation and showing what S-curve signals are generated when the light beam spot goes through the respective layers of a multilayer BD disc.

FIG. 4 is a schematic representation illustrating where the objective lens 230 passes during a focus search operation and showing what S-curve signals are generated when the light beam spot goes through the respective layers of a multilayer BD disc. As shown in FIG. 4, when an FE signal is detected using a threshold value, the FE signal is detected not just by measuring the amplitude of either half of the FE signal but also by comparing the local maximum and minimum values of that FE signal to each other. By turning the polarity of the FE signal into positive only using an absolute value circuit, for example, it can be determined that when either a local minimum value or a local maximum value is detected, an S-curve signal has been detected. When an S-curve signal is detected, the output FEP of the S-curve signal detecting section rises. If an S-curve signal is detected based on at least one of the local minimum and local maximum values thereof, the S-curve signal can still be detected even when the S-curve signal has an asymmetric shape due to the influence of spherical aberration or astigmatism.

Next, it will be described exactly in what flow multilayer discs are grouped according to this preferred embodiment.

Figure 5:
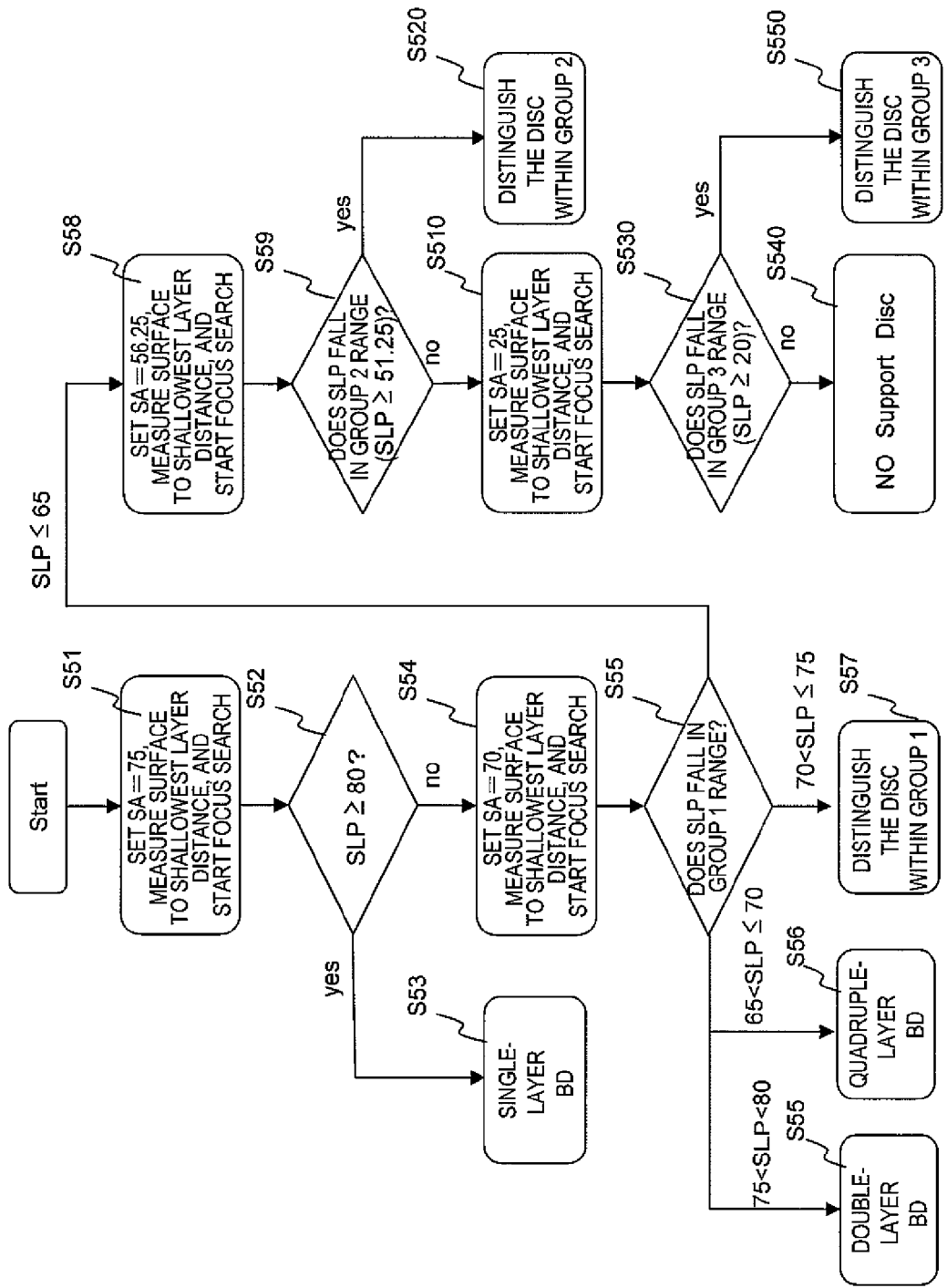
FIG. 5 is a flowchart showing the flow of a multilayer disc grouping process according to a first preferred embodiment of the present invention.

FIG. 5 is a flowchart showing the flow of a multilayer disc grouping process to be carried out based on the depth of the shallowest layer (corresponding to the cover layer thickness), i.e., the distance (SLP) measured from the disc surface to the shallowest layer.

Figure 6:
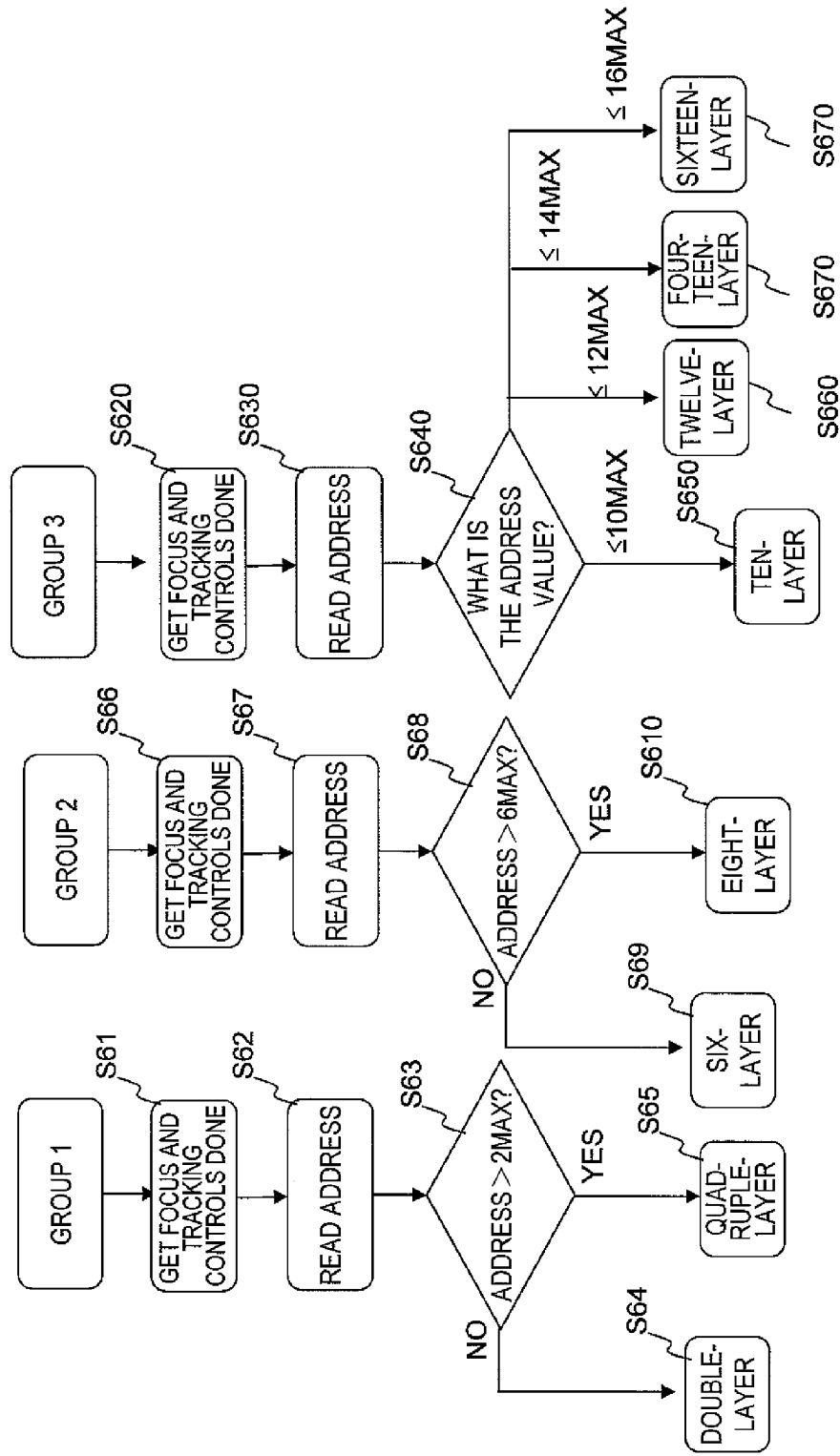
FIG. 6 is a flowchart showing a flow of a number-of-layer determining process to be performed on each of multilayer discs that have already been grouped.

On the other hand, FIG. 6 is a flowchart showing the flow of a number-of-layer determining process to be performed on each of multilayer discs that have already been grouped. Following this flow, the optical disc drive can determine exactly how many layers the BD loaded has.

Hereinafter, the multilayer disc grouping process and number-of-layers determining process will be described with reference to FIGS. 5 and 6.

As shown in FIG. 5, when the optical disc drive is loaded with a single-layer, double-layer or multilayer BD, the optical disc drive temporarily sets the spherical aberration SA in Step S51 to be a predetermined value that is associated with the shallowest layer L2 of a double-layer BD and that may be 75 μm when converted into a cover layer thickness, and then starts a focus search operation. Whenever the focus search operation is performed, an S-curve signal representing the disc surface and another S-curve signal representing the shallowest layer (such as the second layer L1 of a double-layer BD, the fourth layer L4 of a quadruple-layer BD, or the sixteenth layer L16 of a sixteen-layer BD) are always detected. The disc distinguishing section 260 calculates the difference between the focus drive value of the focus actuator 232 when the S-curve signal representing the disc surface is detected and that of the focus actuator 232 when the S-curve signal representing the shallowest layer is detected. This drive value difference corresponds to the distance that the objective lens 230 has traveled, i.e., the distance SLP from the disc surface to the shallowest layer. That is why if the drive value difference is converted into the DC sensitivity of the focus actuator, the distance SLP can be calculated easily.

Next, in Step S52, the disc distinguishing section 260 determines whether or not the SLP calculated is equal to or longer than 80 μm. If it has determined that SLP≥80 μm, the disc distinguishing section 260 determines the optical disc loaded to be a single-layer BD in Step S53. Generally speaking, every BD may have a variable cover layer thickness falling within a predetermined range. Specifically, a double-layer BD is supposed to have a cover layer thickness falling within the range of 70 μm to 80 μm with a center value of 75 μm. Stated otherwise, a multilayer BD with more than two layers will never have a cover layer thickness of 80 μm or more. That is why if SLP has turned out to be 80 m or more, the optical disc loaded can be exclusively determined to be a single-layer disc.

On the other hand, if the SLP is less than 80 μm, the disc loaded may belong to a group including double- and quadruple-layer BDs, a group including eight-layer BDs or a group including sixteen-layer BDs. In that case, the spherical aberration is set in Step S54 to be a value that corresponds to a depth of 70 μm of the shallowest layer L4 of a quadruple-layer BD and then a focus search operation is started. As described above, the difference between the focus drive value of the focus actuator 232 when the S-curve signal representing the disc surface is detected and that of the focus actuator 232 when the S-curve signal representing the shallowest layer is detected is also calculated. After the spherical aberration condition has been changed in this manner, the distance SLP is calculated again.

Next, in Step S55, the disc distinguishing section 260 determines what range the SLP calculated falls in. Specifically, if 65 μm<SLP≤70 μm, the disc loaded is determined to be a quadruple-layer BD in Step S56. On the other hand, if 75 μm<SLP<80 μm, the disc loaded is determined to be a double-layer BD in Step S55. However, if 70 μm<SLP≤75 μm, then this range overlaps with the lower limit of the variable cover layer thickness range of the double-layer BD and with the upper limit of the variable cover layer thickness range of the quadruple-layer BD, and therefore, the process advances to Step S57 of distinguishing the disc loaded from the other discs belonging to the same Group 1, which will be described in detail later.

And if SLP≤65 μm, then the disc loaded is estimated to be a BD with more than four (i.e., six or more) layers. That is why in Step S58, the spherical aberration is set to be a predetermined value that is associated with the shallowest layer L8 of an eight-layer BD (and that may be 56.25 μm when converted into a cover layer thickness) and a focus search operation is started. At the same time, the difference in focus drive value is also calculated and the SLP is obtained.

If the SLP has turned out to be 51.25 μm or more in Step S59, then the disc loaded will be either a six-layer disc or an eight-layer disc, and therefore, the process advances to Step S520 of distinguishing the disc loaded from the other discs belonging to the same Group 2. On the other hand, if the SLP is less than 51.25 μm, the disc loaded is estimated to be a BD with ten or more layers.

Next, in Step S510, the spherical aberration is set to be a predetermined value that is associated with the shallowest layer L16 of a sixteen-layer BD (and that may be 25 μm when converted into a cover layer thickness) and a focus search operation is started. At the same time, the difference in focus drive value is also calculated and the SLP is obtained.

If the SLP has turned out to be 20 μm or more in Step S530, then the disc loaded will be a ten-layer disc, a twelve-layer disc, a fourteen-layer disc or a sixteen-layer disc, and therefore, the process advances to Step S550 of distinguishing the disc loaded from the other discs belonging to the same Group 3. On the other hand, if the SLP is less than 20 μm, the disc loaded is determined in Step S540 to be a non-compatible one and either an error message is displayed or the disc is ejected quickly.

As described above, according to this preferred embodiment, the spherical aberration SA is adjusted to an optical disc that has a smaller cover layer thickness (or a larger storage capacity) than any other candidate multilayer disc in the same group at that point in time. As a result, the disc loaded can be exclusively distinguished even more accurately.

Alternatively, the spherical aberration may also be set differently. The fundamental principle of this preferred embodiment lies in detecting the output of an S-curve signal representing an information layer that is located closest to the disc surface (i.e., the shallowest layer). That is why the group which a given optical disc belong to can be determined by an S-curve signal to be detected next to the S-curve signal representing the disc surface during the focus search operation. In that case, the threshold value of detection may be set to be a low value so that the S-curve signal can be detected easily. With the threshold value of detection set to be low, even if the spherical aberration has an initial setting to be obtained by converting the depth of 100 μm of the reference layer of a single-layer disc, the depth of 75 of the L2 layer of a double-layer disc, the depth of the L16 layer of a sixteen-layer disc, or the depth of 25 μm of the L20 layer of a twenty-layer disc, the SLP can still be measured accurately.

Hereinafter, it will be described how to distinguish the disc loaded from the other discs belonging to the same group.

First of all, without changing the spherical aberration setting, a focus control and a tracking control get done on the shallowest layer. Next, by reading either the pits or the wobble address that has been pre-formatted on the disc, the disc loaded can be distinguished from the others belonging to the same group. FIG. 6 is a flowchart showing its procedure.

In Group 1, the disc loaded is determined to be either a double-layer BD or a quadruple-layer BD. In Group 2, the disc loaded is determined to be either a six-layer BD or an eight-layer BD. And in Group 3, the disc loaded is determined to be a ten-layer BD, a twelve-layer BD, a fourteen-layer BD or a sixteen-layer BD.

In distinguishing the disc loaded in Group 1, the address value at any location on the shallowest layer L4 of a quadruple-layer BD is always greater than the maximum address value L2MAX of a double-layer BD, because a quadruple-layer BD has twice as large storage capacity as a double-layer BD. In other words, the address at any location on the double-layer BD is always equal to or smaller than L2MAX. By taking advantage of this fact, if the address value that has been read by getting the focus and tracking controls done is equal to or smaller than the maximum address 2MAX of the double-layer BD in Step S61 to S63, the disc loaded is determined to be a double-layer disc in Step S64. On the other hand, if the address value is greater than the maximum address 2MAX, then the disc loaded is determined to be a quadruple-layer disc in Step S65.

In the same way, in Group 2, the disc loaded is determined to be either a six-layer BD or an eight-layer BD. The address value at any location on the shallowest layer L8 of an eight-layer BD is always greater than the maximum address value L6MAX of a six-layer BD, because an eight-layer BD has 1.2 times as large storage capacity as a six-layer BD. By taking advantage of this fact, if the address value that has been read by getting the focus and tracking controls done is equal to or smaller than the maximum address 6MAX of the six-layer BD in Step S66 to S68, the disc loaded is determined to be a six-layer disc in Step S69. On the other hand, if the address value is greater than the maximum address 6MAX, then the disc loaded is determined to be an eight-layer disc in Step S610.

Likewise, in Group 3, the disc loaded is determined to be a ten-, twelve-, fourteen- or sixteen-layer BD. The disc loaded can be distinguished by comparing to each other address values at any arbitrary locations on the respective shallowest layers of each pair of BDs, of which the storage capacities are different from each other by two layers' capacity. By taking advantage of this fact, if the address value that has been read by getting the focus and tracking controls done is equal to or smaller than the maximum address 10MAX of the ten-layer BD in Step S620 to S640, the disc loaded is determined to be a ten-layer disc in Step S650. If the address value read is equal to or smaller than the maximum address 12MAX of the twelve-layer BD, the disc loaded is determined to be a twelve-layer BD in Step S610. If the address value read is equal to or smaller than the maximum address 14MAX of the fourteen-layer BD, the disc loaded is determined to be a fourteen-layer BD in Step S670. And if the address value read is equal to or smaller than the maximum address 16MAX of the sixteen-layer BD, the disc loaded is determined to be a sixteen-layer BD in Step S680.

These comparisons may be made conversely. Specifically, in distinguishing the disc loaded in Group 1, if the address value that has been read by getting the focus and tracking controls done is greater than the maximum address 2MAX of the double-layer BD, the disc loaded may be determined to be a quadruple-layer disc. On the other hand, if the address value is equal to or smaller than the maximum address 2MAX, then the disc loaded may be determined to be a double-layer disc. Also, in distinguishing the disc loaded in Group 2, if the address value that has been read by getting the focus and tracking controls done is greater than the maximum address 6MAX of the six-layer BD, the disc loaded may be determined to be an eight-layer disc. On the other hand, if the address value is equal to or smaller than the maximum address 6MAX, then the disc loaded may be determined to be a six-layer disc.

Furthermore, in distinguishing the disc loaded in Group 3, if the address value that has been read by getting the focus and tracking controls done is greater than the maximum address 14MAX of the fourteen-layer BD and equal to or smaller than the maximum address 16MAX of the sixteen-layer BD, the disc loaded may be determined to be a sixteen-layer disc. If the address value is greater than the maximum address 12MAX of the twelve-layer BD and equal to or smaller than the maximum address 14MAX of the fourteen-layer BD, then the disc loaded may be determined to be a fourteen-layer BD. If the address value is greater than the maximum address 10MAX of the ten-layer BD and equal to or smaller than the maximum address 12MAX of the twelve-layer BD, then the disc loaded may be determined to be a twelve-layer BD. And if the address value is equal to or smaller than the maximum address 10MAX of the ten-layer BD, then the disc loaded may be determined to be a ten-layer BD.

According to the method described above, the disc loaded is distinguished from the other discs belonging to the same group by reference to the information that has been obtained from the shallowest layer. However, this is just an example of the present invention. Alternatively, the disc loaded can also be distinguished from the other discs belonging to the same group by reference to information that has been obtained from any other information layer, e.g., an information layer that is located adjacent to the shallowest layer.

Next, another method for distinguishing the disc loaded from the others belonging to the same group will be described. According to this second intra-group distinguishing method, the depth of the shallowest layer (corresponding to the cover layer thickness) is determined by a spherical aberration setting and an increase or decrease in the amplitude of a TE signal at that setting, thereby determining the number of layers that the BD loaded has.

FIG. 7(a) shows how the TE signal output from a quadruple-layer BD changes its waveform in a situation where a spherical aberration setting for its shallowest layer L4 is adjusted to 70 μm when converted into a cover layer thickness and in a situation where the spherical aberration is varied to 75 μm when converted into the cover layer thickness of the shallowest layer L2 of a double-layer BD. On the other hand, FIG. 7(b) shows how the TE signal output from a double-layer BD changes its waveform in a situation where a spherical aberration setting for its shallowest layer L2 is adjusted to 75 μm when converted into a cover layer thickness and in a situation where the spherical aberration is varied to 70 μm when converted into the cover layer thickness of the shallowest layer L4 of a quadruple-layer BD.

Figure 7:
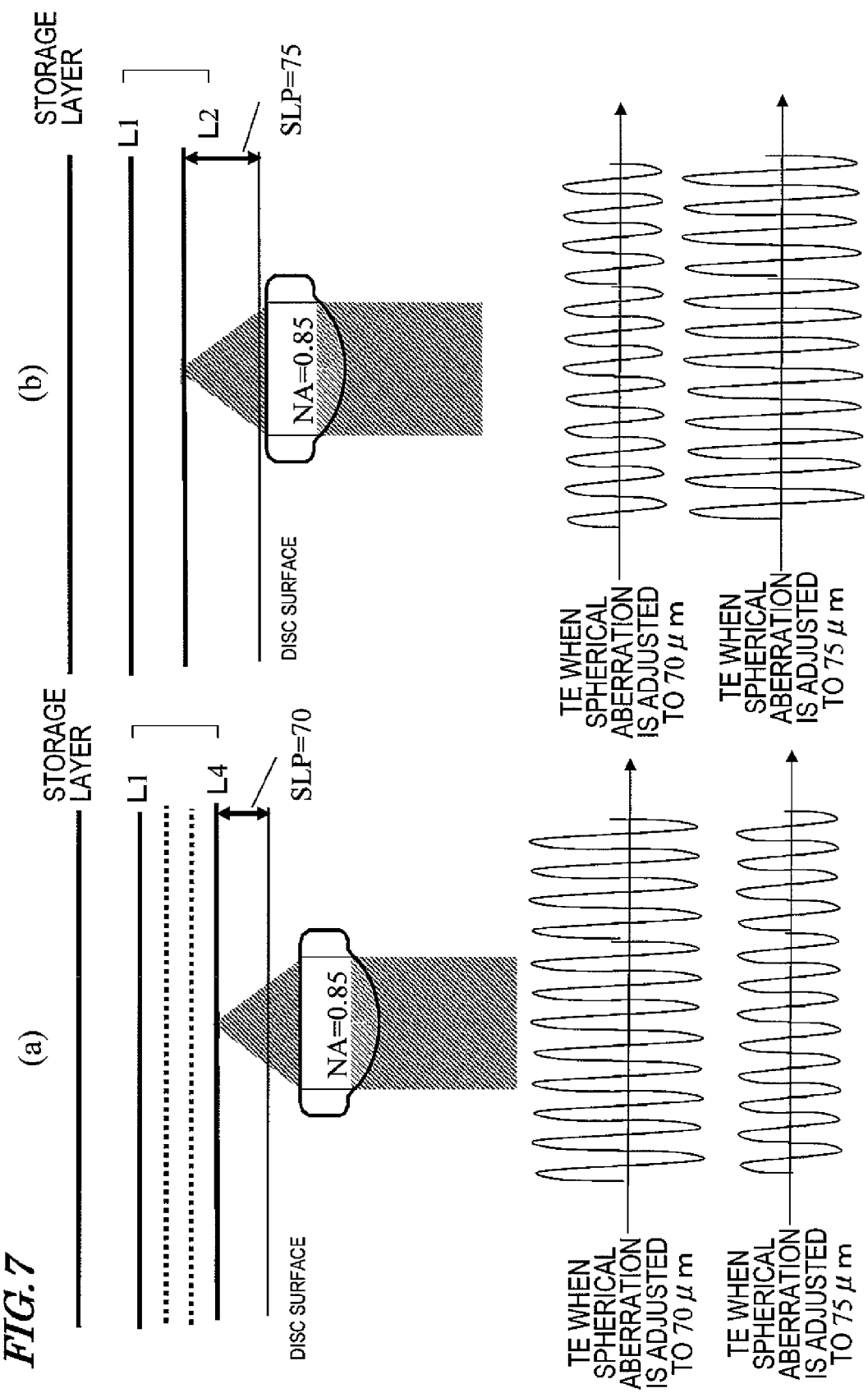
FIG. 7 shows how the output TE signal changes its amplitude if multiple different spherical aberrations are set with respect to a multilayer BD.

As shown in FIG. 7, if the spherical aberration setting is adjusted exactly to the cover layer thickness of its shallowest layer, the TE signal has increased amplitude. However, if the spherical aberration setting is varied from its associated cover layer thickness, then the TE signal comes to have decreased amplitude. By taking advantage of this property, the depth of the shallowest layer on which the focus has been set (i.e., the cover layer thickness) can be calculated. Optionally, instead of adjusting (or correcting) the spherical aberration setting according to the TE signal, the spherical aberration setting may also be adjusted (or corrected) according to an FE signal.

Figure 8:
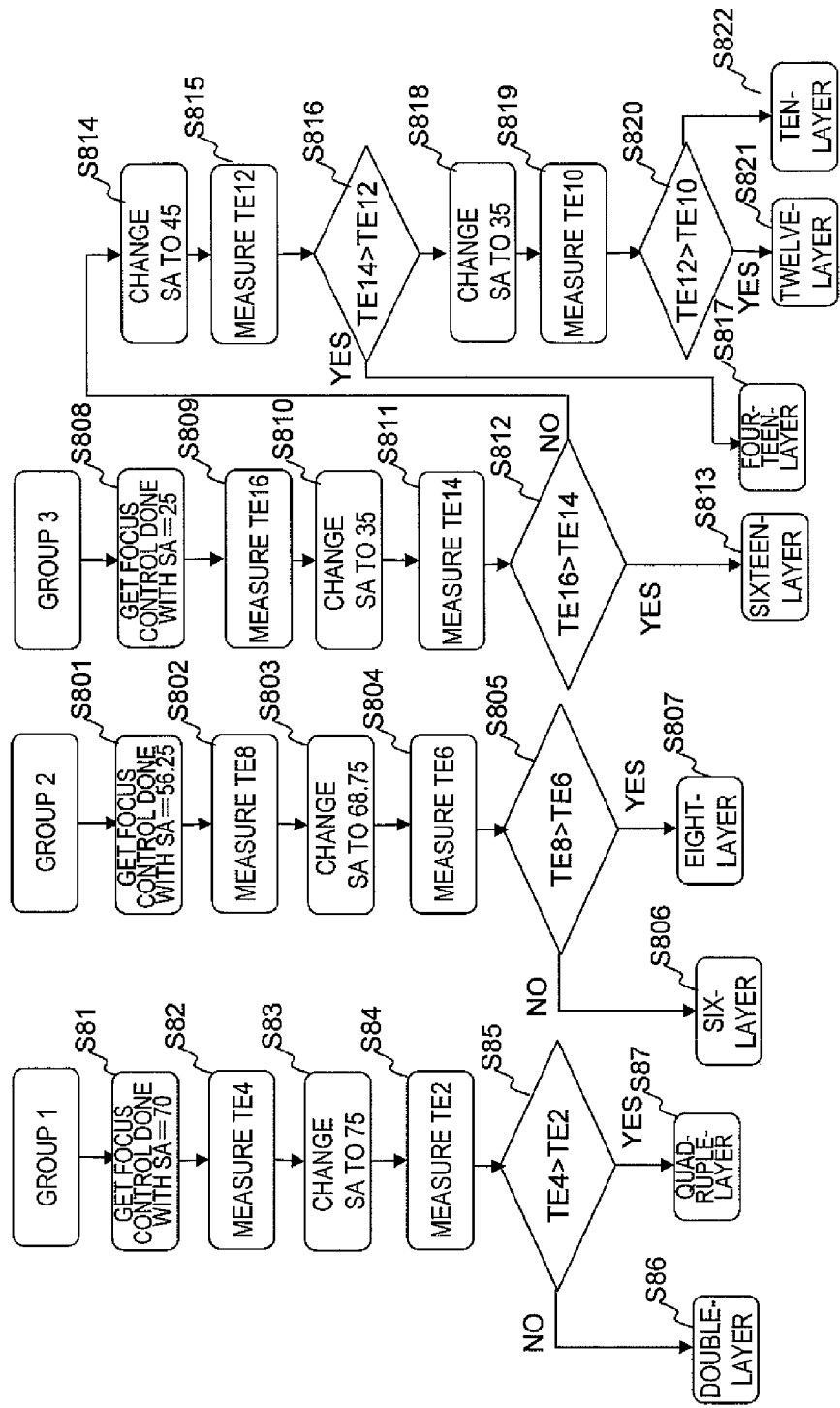
FIG. 8 is a flowchart showing an alternative flow of the intra-group number-of-layers determining process.

FIG. 8 is a flowchart showing the procedure of performing an intra-group distinguishing process by detecting how much the amplitude of a TE signal increases or decreases according to the spherical aberration setting. It should be noted that the BDs may be classified into Groups 1, 2 and 3 by the method described above. Also, in Group 1, the disc loaded is determined to be either a double-layer BD or a quadruple-layer BD. In Group 2, the disc loaded is determined to be either a six-layer BD or an eight-layer BD. And in Group 3, the disc loaded is determined to be a ten-, twelve-, fourteen or sixteen-layer BD.

In Group 1, first of all, in Step S81, a focus control is performed on the shallowest layer, thereby adjusting the spherical aberration setting to 70 μm when converted into the cover layer thickness of the shallowest layer L4. Next, in Step S82, the amplitude TE4 of the TE signal is measured in that state. Then, in Step S83, the spherical aberration setting is changed to 75 μm when converted into the cover layer thickness (or depth) of the shallowest layer L2 of a double-layer BD. Subsequently, in Step S84, the amplitude TE2 of the TE signal is measured in that state.

Next, in Step S85, TE4 and TE2 are compared to each other. In that case, if the disc loaded is a double-layer disc, then its cover layer thickness is 75 μm, and therefore, TE2, to which the spherical aberration setting is adjusted, becomes greater than TE4. On the other hand, if the disc loaded is a quadruple-layer disc, then its cover layer thickness is 75 μm, and therefore, TE4, to which the spherical aberration setting is adjusted, becomes greater than TE2. That is why if TE4≤TE2 then the disc loaded is determined to be a double-layer BD in Step S86. But if TE4>TE2, the disc loaded is determined to be a quadruple-layer BD in Step S87. As a result, just by getting the focus control done (i.e., without getting the tracking control or address reading done), the disc belonging to this Group 1 can be easily determined to be either a double-layer BD or a quadruple-layer BD.

As for Group 2, first of all, in Step S801, the spherical aberration setting is adjusted to 56.25 μm when converted into the cover layer thickness of the shallowest layer L8 of an eight-layer BD. Next, in Step S802, the amplitude TE8 of the TE signal is measured in that state. Then, in Step S803, the spherical aberration setting is varied to 68.25 μm when converted into the cover layer thickness of the shallowest layer L6 of a six-layer BD. Subsequently, in Step S804, the amplitude TE6 of the TE signal is measured in that state. Next, in Step S805, TE8 and TE6 are compared to each other. In that case, if the disc Loaded is a six-layer disc, then its cover layer thickness is 68.25 μm, and therefore, TE6, to which the spherical aberration setting is currently adjusted, becomes greater than TE8. On the other hand, if the disc loaded is an eight-layer disc, then its cover layer thickness is 56.25 μm, and therefore, TE8, to which the spherical aberration setting is currently adjusted, becomes greater than TE6. That is why if TE8≤TE6, then the disc loaded is determined to be a six-layer BD in Step S806. But if TE8>TE6, the disc loaded is determined to be an eight-layer BD in Step S807. As a result, just by getting the focus control done (i.e., without getting the tracking control or address reading done), the disc belonging to this Group 2 can be easily determined to be either a six-layer BD or an eight-layer BD.

Likewise, a series of similar processing steps S808 through S822 are also performed on Group 3. That is to say, spherical aberration settings are adjusted to respective values that have been converted into the cover layer thicknesses of the sixteen-, fourteen-, twelve- and ten-layer BDs and the amplitudes of the TE signals are measured in that state. After that, the respective measured values TE16, TE14, TE12 and TE10 are compared to each other, thereby determining the disc loaded to be one of sixteen-, fourteen-, twelve- and ten-layer BDs that belong to the same group.

As described above, according to this preferred embodiment, by measuring the distance from the disc surface to the shallowest layer (i.e., the cover layer thickness) through a focus search operation, multilayer discs are classified into a number of groups (e.g., three groups in this preferred embodiment). Also, according to either the value of the address information that has been read from the shallowest layer or the amplitude of a TE signal (or an FE signal) that has been measured on the shallowest layer with respect to a spherical aberration setting, the depth of the shallowest layer (i.e., the cover layer thickness) is determined with respect to each of those groups. And once the cover layer thickness is known, it can be determined easily how many layers the disc loaded has (i.e., what is the number of layers of the disc loaded). Generally speaking, if the depth (or the thickness) of a cover layer is measured based on the magnitude of a spherical aberration correction, the cover layer thickness can certainly be measured accurately through a focus search operation but it takes a while to get the measuring done in that way. For that reason, according to this preferred embodiment, the focus search operation is performed to get the multilayer disc grouping process done and the spherical aberration correction is made to get the intra-group distinguishing process done.

It should be noted that in a twenty-layer disc (such as a twenty-layer BD), those layers may be stacked so as to come toward, or go away from, the surface with respect to the reference layer (with a cover layer thickness of 100 μm). But even a twenty-layer disc may also be distinguished in the same way as in the group to which a sixteen-layer disc belongs.

Embodiment 2

Hereinafter, a second preferred embodiment of the present invention will be described.

According to this preferred embodiment, the method in which the distance between information layers (i.e., their layer-to-layer distance) is measured according to the difference in the position (or the height) of an objective lens when an S-curve signal is detected from each of those information layers is not adopted. Instead, according to this preferred embodiment, a focus is set on each of those information layers and the spherical aberration setting is optimized. Since the difference in associated spherical aberration between one information layer and its adjacent information layer corresponds to a layer-to-layer distance, the layer-to-layer distance can be obtained based on the difference in adjusted spherical aberration setting. And once the layer-to-layer distance is obtained, it can be determined accurately what group the disc loaded belongs to. According to this preferred embodiment, a focus is set on the shallowest layer, and the distance from the disc surface to the shallowest layer (i.e., the cover layer thickness) is measured based on the magnitude of spherical aberration correction, thereby determining what group the disc loaded belongs to.

Figure 9:
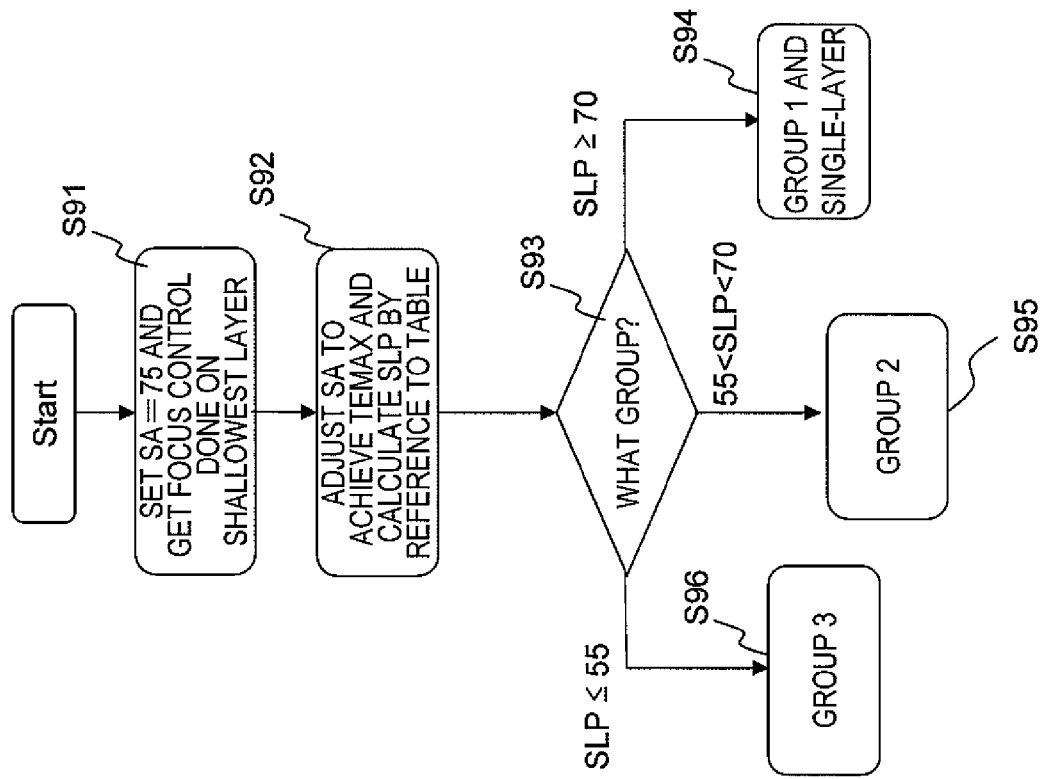
FIG. 9 is a flowchart showing the flow of a multilayer disc grouping process according to a second preferred embodiment of the present invention.

FIG. 9 is a flowchart showing the procedure of performing a grouping process by comparing to each other spherical aberration settings (the magnitudes of correction) with respect to respective layers. In this example, the cover layer thickness is measured based on the spherical aberration setting, and it is determined, by that cover layer thickness, what group the disc loaded belongs to. However, a layer-to-layer pitch (i.e., the distance from one information layer to its adjacent one) may also be measured based on the spherical aberration setting and the grouping process may get done based on that layer-to-layer pitch.

Hereinafter, a multilayer disc distinguishing process will be described with reference to FIG. 9. The optical disc drive of the first preferred embodiment described above is also used in this preferred embodiment.

As shown in FIG. 9, when the drive is loaded with a single-layer, double-layer or multilayer BD, the spherical aberration SA is temporarily set in Step S91 to a predetermined value for the shallowest layer L2 of a double-layer BD, e.g., 75 μm when converted into a cover layer thickness, and a focus search operation is performed. The S-curve signal to be detected for the first time after the S-curve signal representing the disc surface has been detected as a result of the focus search operation represents the shallowest layer (e.g., the second layer L1 of a double-layer BD, the fourth layer L4 of a quadruple-layer BD, or the sixteenth layer L16 of a sixteen-layer BD) as shown in FIG. 4. That is why if the S-curve signal detected indicates that this is the shallowest layer, the focus control can get done easily on that layer.

Next, in Step S92, after the focus control has gotten done on the shallowest layer, the spherical aberration is adjusted so that the TE signal has the maximum amplitude on that shallowest layer. Based on that adjusted spherical aberration setting, the depth of the shallowest layer on which the focus is currently set (which corresponds to the cover layer thickness and which will be sometimes referred to herein as an "SLP") can be measured. Optionally, the TE signal may be replaced with an FE signal and the spherical aberration may be adjusted so that the FE signal has its amplitude maximized. Next, in Step S93, the disc distinguishing section 260 can get the multilayer BD grouping process done as shown in FIG. 10 based on the distance from the disc surface to the shallowest layer (i.e., the cover layer thickness SLP).

In Step S96, if the cover layer thickness SLP is equal to or smaller than 55 μm, the disc loaded should belong to Group 3. Thus, the disc loaded is determined to be a sixteen-layer BD if SLP=25 μm±2, a fourteen-layer BD if SLP=35 μm±2, and a twelve-layer BD if SLP=45 μm±2. And if SLP=55 μm±2, then the disc loaded is either a ten-layer BD or an eight-layer BD belonging to Group 2. In that case, the focus is shifted to an adjacent deeper layer by performing a focus jump operation and the spherical aberration is adjusted again so that that layer has TE$_{max}$. The difference between the distance from the surface to that adjacent layer to be calculated based on the adjusted setting (i.e., the cover layer thickness SLP-1) and the cover layer thickness SLP before the focus jump operation becomes the layer-to-layer pitch LP. And based on that LP value, it can be determined whether the disc loaded is an eight-layer BD or a ten-layer BD. This decision can be made by simply comparing the layer-to-layer pitch LP of the disc loaded to the maximum value LP10 of a ten-layer BD or the minimum value LP8 of an eight-layer BD. Specifically, if LP≤LP10 (=5.5 μm), then the disc loaded can be determined to be a ten-layer BD. On the other hand, if LP>LP8 (6 μm), then the disc loaded can be determined to be an eight-layer BD.

In Step S95, if the cover layer thickness SLP is greater than 55 μm but smaller than 70 μm, the disc loaded should belong to Group 2. In that case, the disc loaded is determined to be an eight-layer BD if SLP=56.25 μm±2. But if SLP=68.75 μm±2, then the disc loaded is either a six-layer BD or a quadruple-layer BD belonging to Group 3. In that case, the focus is shifted to an adjacent deeper layer by performing a focus jump operation and the spherical aberration is adjusted again so that that layer has TE$_{max}$. The difference between the distance from the surface to that adjacent layer to be calculated based on the adjusted setting (i.e., the cover layer thickness SLP-1) and the cover layer thickness SLP before the focus jump operation becomes the layer-to-layer pitch LP. And based on that LP value, it can be determined whether the disc loaded is a quadruple-layer BD or a six-layer BD.

Furthermore, in Step S95, if the cover layer thickness SLP is equal to or greater than 70 μm, the disc loaded should either belong to Group 1 or a single-layer BD. Thus, the disc loaded is determined to be a quadruple-layer BD if SLP=70 μm±2, a double-layer BD if SLP=75 μm±2, and a single-layer BD if SLP=100 μm±2.

According to the multilayer disc distinguishing method of this second preferred embodiment, the cover layer thickness is measured based on the adjusted spherical aberration setting as in the method of the fourth preferred embodiment to be described later. If the NA is as high as what is required by a BD, the amplitude of a TE or FE signal is so sensitive to the spherical aberration that the accuracy of measurement and decision is very high. On top of that, according to this method, not only the distance from the disc surface to the shallowest layer (corresponding to the cover layer thickness) but also the distance from an arbitrary information layer to its adjacent information layer (i.e., the layer-to-layer pitch) can be measured with high accuracy. That is why if the group can be determined by the layer-to-layer pitch, instead of the cover layer thickness, it can be determined what group the disc loaded belongs to by obtaining the magnitudes of spherical aberration correction to be made on two information layers and measuring the layer-to-layer pitch.

According to the preferred embodiment described above, the spherical aberration is supposed to be adjusted so that a TE or FE signal has maximum amplitude with respect to either the shallowest layer or another information layer. However, if sufficiently high sensitivity is achieved with respect to the spherical aberration, any other signal quality index (such as a jitter (including MLSE) or the amplitude of a read signal) may also be adjusted for that purpose.

Embodiment 3

Hereinafter, different grouping methods from what has already been described for the first and second preferred embodiments of the present invention will be described.

According to the pattern shown in FIG. 14, the cover layer thickness is supposed to be substantially the same within each group of information layers but vary significantly from one group to another. The layer-to-layer pitch is optimized within each group according to the total number of layers.

On the other hand, according to the pattern shown in FIG. 15, the layer-to-layer pitch is supposed to be substantially the same within each group of information layers but vary significantly from one group to another. The light-transmissive layer thickness is optimized within each group according to the total number of layers.

FIG. 16 shows a variation of the pattern shown in FIG. 15. To eliminate the influence of cross-talk, the layer-to-layer pitch is changed alternately in Group 4 that has a layer-tolayer pitch LP of 3.125. For example, a sixteen-layer medium has a layer-to-layer distance of 3.25 μm between an odd-numbered layer and an even-numbered layer and 3 μm between an even-numbered layer and an odd-numbered layer. And the distance from the surface of a sixteen-layer disc to its shallowest information layer becomes 53.25 μm.

Hereinafter, it will be described what to do with the pattern shown in FIG. 14 and what to do with the pattern shown in FIG. 15. If the pattern shown in FIG. 16 is adopted, however, the disc distinguishing process to perform is the same as the situation where the pattern shown in FIG. 15 is used.

Figure 17:
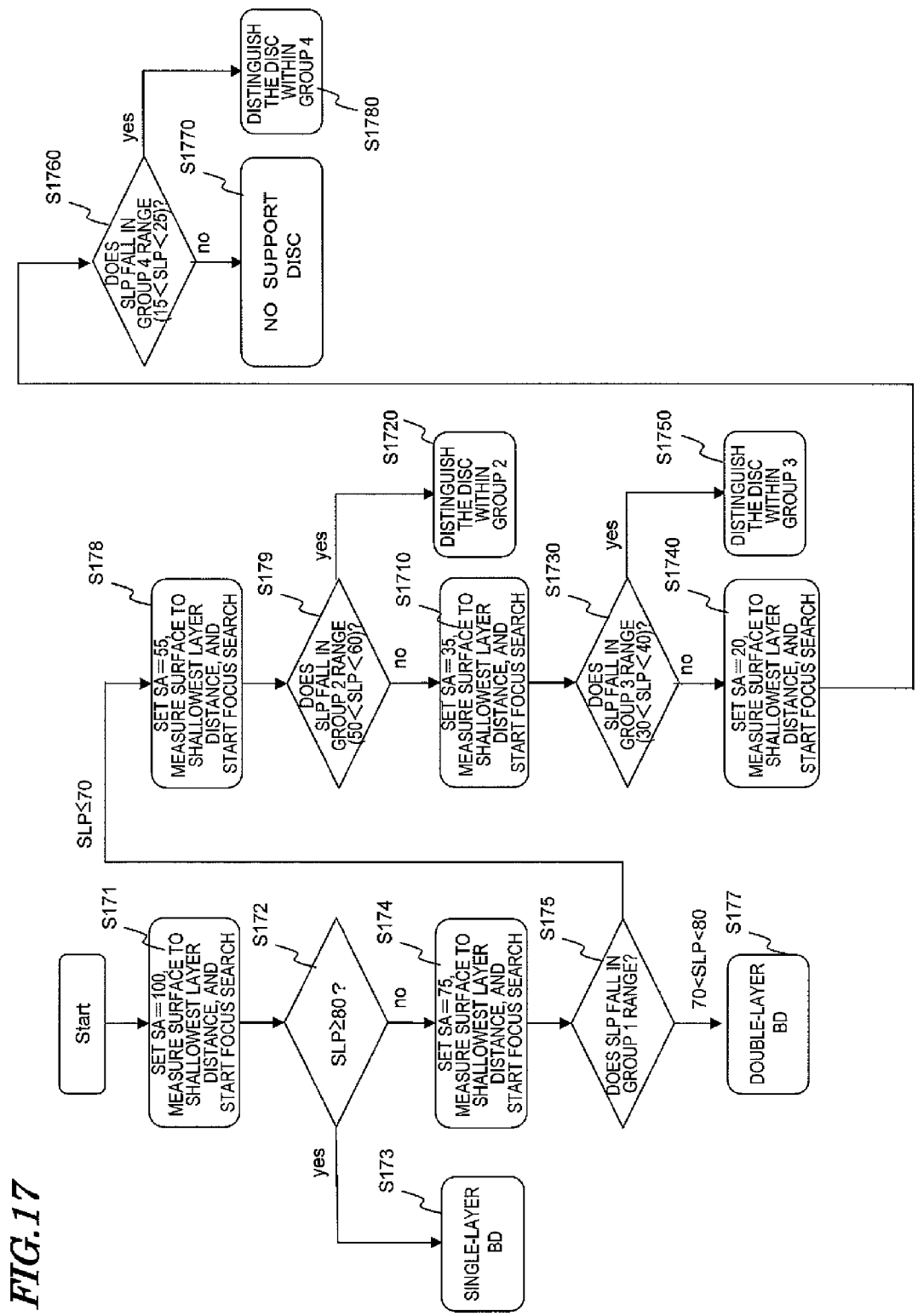
FIG. 17 is a flowchart showing the flow of a multilayer disc grouping process according to a third preferred embodiment of the present invention.

FIG. 17 is a flowchart showing the flow of a process in which the depth of the shallowest layer (which corresponds to the cover layer thickness and the distance SLP from the disc surface to the shallowest layer) is measured and in which it is determined, by the magnitude of the SLP value measured, what group the multilayer disc loaded belongs to.

Figure 18:
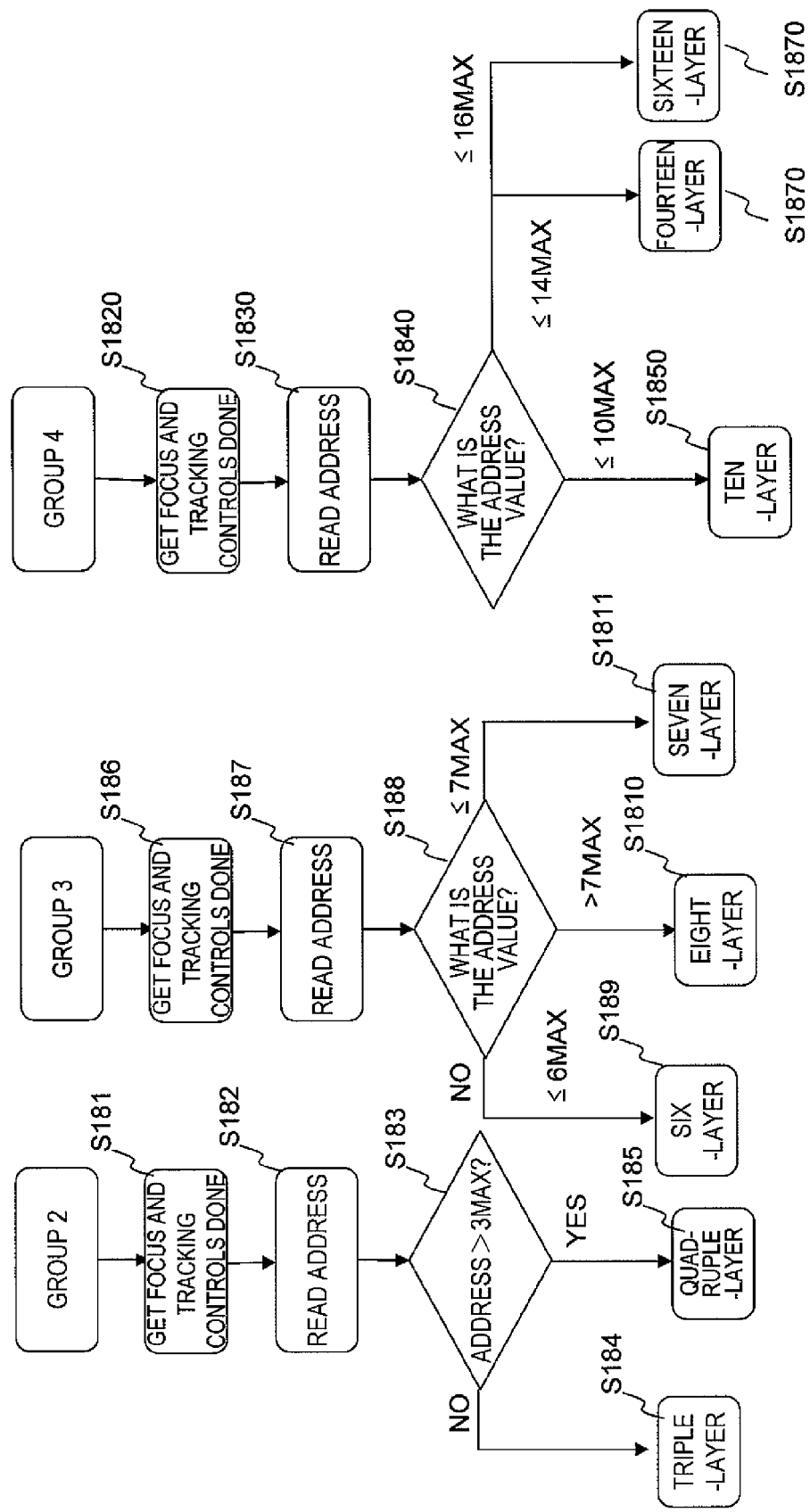
FIG. 18 is a flowchart showing an exemplary flow of an intra-group number-of-layers determining process according to the third preferred embodiment.

FIG. 18 is a flowchart showing in what procedure a number-of-layers determining process needs to be performed within each group on the disc loaded after it has been determined what group that disc belongs to. Following this flow, the optical disc drive can determine how many layers the BD loaded has.

Hereinafter, the multilayer disc grouping process and number-of-layers determining process will be described with reference to FIGS. 17 and 18.

As shown in FIG. 17, when the optical disc drive is loaded with a single-layer, double-layer or multilayer BD, the optical disc drive temporarily sets the spherical aberration SA in Step S171 to be a predetermined value that is associated with the shallowest layer L1 of a single-layer BD and that may be 100 μm when converted into a cover layer thickness, and then starts a focus search operation. Whenever the focus search operation is performed, an S-curve signal representing the disc surface and another S-curve signal representing the shallowest layer (such as the second layer L1 of a double-layer BD, the fourth layer L4 of a quadruple-layer BD, or the sixteenth layer L16 of a sixteen-layer BD) are always detected. The disc distinguishing section 260 calculates the difference between the focus drive value of the focus actuator 232 when the S-curve signal representing the disc surface is detected and that of the focus actuator 232 when the S-curve signal representing the shallowest layer is detected. This drive value difference corresponds to the distance that the objective lens 230 has traveled, i.e., the distance SLP from the disc surface to the shallowest layer. That is why if the drive value difference is converted into the DC sensitivity of the focus actuator, the distance SLP can be calculated easily.

Next, in Step S172, the disc distinguishing section 260 determines whether or not the SLP calculated is equal to or longer than 80 μm. If it has determined that SLP≥80 μm, the disc distinguishing section 260 determines the optical disc loaded to be a single-layer BD in Step S173. Generally speaking, every BD may have a variable cover layer thickness falling within a predetermined range. Specifically, a double-layer BD is supposed to have a cover layer thickness falling within the range of 70 μm to 80 μm with a center value of 75 μm. Stated otherwise, a multilayer BD with more than two layers will never have a cover layer thickness of 80 μm or more. That is why if SLP has turned out to be 80 μm or more, the optical disc loaded can be exclusively determined to be a single-layer disc.

On the other hand, if the SLP is less than 80 μm, the disc loaded may be a double-layer BD or belong to a group including triple- and quadruple-layer BDs, a group including six-, seven- and eight-layer BDs or a group including ten-, fourteen- and sixteen-layer BDs. In that case, the spherical aberration is set in Step S174 to be a value that corresponds to a depth of 75 μm of the shallowest layer L4 of a double-layer BD and then a focus search operation is started. As described above, the difference between the focus drive value of the focus actuator 232 when the S-curve signal representing the disc surface is detected and that of the focus actuator 232 when the S-curve signal representing the shallowest layer is detected is also calculated. After the spherical aberration condition has been changed in this manner, the distance SLP is calculated again.

Next, in Step S175, the disc distinguishing section 260 determines what range the SLP calculated falls in. Specifically, if 70 μm<SLP<80 μm, the disc loaded is determined to be a double-layer BD in Step S177. On the other hand, if SLP≤70 μm, the disc loaded is determined to be a BD with three or more information layers and the process advances to Step S178.

And if SLP≤70 μm, the spherical aberration is set in Step S178 to be a predetermined value that is associated with the respective shallowest layers L3 and L4 of a triple-layer BD and a quadruple-layer BD (and that may be 55 μm when converted into a cover layer thickness) and a focus search operation is started. At the same time, the difference in focus drive value is also calculated and the SLP is obtained.

If the SLP has turned out in Step S179 to satisfy 50<SLP<60 μm, then the disc loaded will be either a triple-layer BD or a quadruple-layer BD, and therefore, the process advances to Step S1720 of distinguishing the disc loaded from the other discs belonging to the same Group 2. On the other hand, if the SLP is less than 50 μm, the disc loaded is estimated to be a BD with six or more layers. In that case, the process advances to Step S1710.

Next, in Step S1710, the spherical aberration is set to be a predetermined value that is associated with the respective shallowest layers L6, L7 and L8 of a six- seven- and eight-layer BDs (and that may be 35 μm when converted into a cover layer thickness) and a focus search operation is started. At the same time, the difference in focus drive value is also calculated and the SLP is obtained.

If the SLP has turned out in Step S1730 to satisfy 30<SLP<40 μm, then the disc loaded will be a six-, seven- or eight-layer BD, and therefore, the process advances to Step S1750 of distinguishing the disc loaded from the other discs belonging to the same Group 3.

Next, in Step S1740, the spherical aberration is set to be a predetermined value that is associated with the respective shallowest layers L10, L14 and L16 of a ten-, fourteen- and sixteen-layer BDs (and that may be 20 μm when converted into a cover layer thickness) and a focus search operation is started. At the same time, the difference in focus drive value is also calculated and the SLP is obtained.

If the SLP has turned out in Step S1760 to satisfy 15<SLP<25 μm, then the disc loaded will be a ten-, fourteen- or sixteen-layer BD, and therefore, the process advances to Step S1780 of distinguishing the disc loaded from the other discs belonging to the same Group 4.

On the other hand, if the SLP is less than 15 μm, the disc loaded is determined in Step S1770 to be a non-compatible one and either an error message is displayed or the disc is ejected quickly.

As described above, according to this preferred embodiment, the spherical aberration SA is adjusted to an optical disc that has a smaller cover layer thickness (or a larger storage capacity) than any other candidate multilayer disc in the same group at that point in time. As a result, the disc loaded can be exclusively distinguished even more accurately.

Alternatively, the spherical aberration may also be set differently. The fundamental principle of this preferred embodiment lies in detecting the output of an S-curve signal representing an information layer that is located closest to the disc surface (i.e., the shallowest layer). That is why the group which a given optical disc belong to can be determined by an S-curve signal to be detected next to the S-curve signal representing the disc surface during the focus search operation. In that case, the threshold value of detection may be set to be a low value so that the S-curve signal can be detected easily. With the threshold value of detection set to be low, even if the spherical aberration has an initial setting to be obtained by converting the depth of 100 μm of the reference layer of a single-layer disc, the depth of 75 μm of the L2 layer of a double-layer disc, the depth of 20 μm of the L16 layer of a sixteen-layer disc, or the depth of the L20 layer of a twenty-layer disc, the SLP can still be measured accurately.

Hereinafter, it will be described how to distinguish the disc loaded from the other discs belonging to the same group.

First of all, without changing the spherical aberration setting, a focus control and a tracking control get done on the shallowest layer. Next, by reading either the pits or the wobble address that has been pre-formatted on the disc, the disc loaded can be distinguished from the others belonging to the same group. FIG. 18 is a flowchart showing its procedure.

In Group 2, the disc loaded is determined to be either a triple-layer BD or a quadruple-layer BD. In Group 3, the disc loaded is determined to be a six-layer BD, a seven-layer BD or an eight-layer BD. And in Group 4, the disc loaded is determined to be a ten-layer BD, a fourteen-layer BD or a sixteen-layer BD.

In distinguishing the disc loaded in Group 2, the quadruple-layer BD has a larger storage capacity than the triple-layer BD. Also, the innermost location of the shallowest layer L4 of the quadruple-layer BD is the end of its data area with the MAX address. On the other hand, the outermost location of the shallowest layer L3 of the triple-layer BD is the end of its data area with the MAX address.

By taking advantage of this fact, if the address value that has been read by getting the focus and tracking controls done around the innermost location is greater than the MAX address of the triple-layer BD in Step S181 to S183, the disc loaded is determined to be a quadruple-layer disc in Step S184. On the other hand, if the address value is smaller than the MAX address, then the disc loaded is determined to be a triple-layer disc in Step S185.

In the same way, as for Group 3, the disc loaded is determined to be a six-layer BD, a seven-layer BD or an eight-layer BD. The innermost location of the shallowest layer L6 of the six-layer BD is the end of its data area with the MAX address. Likewise, the innermost location of the shallowest layer L8 of the eight-layer BD is the end of its data area with the MAX address. On the other hand, the outermost location of the shallowest layer L7 of the seven-layer BD is the end of its data area with the MAX address. The address value at any location on the shallowest layer L8 of the eight-layer BD is always greater than the maximum address value L6MAX of the six-layer BD, because the eight-layer BD has 1.2 times as large storage capacity as the six-layer BD. By taking advantage of this fact, if the address value that has been read by getting the focus and tracking controls done on the innermost location is equal to or smaller than the maximum address 6MAX of the six-layer BD in Step S186 to S188, the disc loaded is determined to be a six-layer disc in Step S189. On the other hand, if the address value is greater than the maximum address 7MAX of the seven-layer BD, then the disc loaded is determined to be an eight-layer disc in Step S1810.

Furthermore, if the address value is greater than the maximum address 6MAX of the six-layer BD but smaller than the maximum address 7MAX of the seven-layer BD, then the disc loaded is determined to be a seven-layer BD in Step S1811.

Likewise, in Group 4, the disc loaded is determined to be a ten-, fourteen- or sixteen-layer BD. The disc loaded can be distinguished by comparing to each other address values at any arbitrary locations (not just the innermost location) on the respective shallowest layers of each pair of BDs, of which the storage capacities are different from each other by two to four layers' capacity. By taking advantage of this fact, if the address value that has been read by getting the focus and tracking controls done is equal to or smaller than the maximum address 10MAX of the ten-layer BD in Step S1820 to S1840, the disc loaded is determined to be a ten-layer disc in Step S1850. If the address value read is equal to or smaller than the maximum address 14MAX of the fourteen-layer BD, the disc loaded is determined to be a fourteen-layer BD in Step S1870. And if the address value read is equal to or smaller than the maximum address 16MAX of the sixteen-layer BD, the disc loaded is determined to be a sixteen-layer BD in Step S1880.

In the preferred embodiment described above, the address is supposed to be read with the focus set around the innermost location. If the respective layers have the same density within each group, however, the disc loaded can be distinguished by comparing the address that has been read from any radial location to the maximum address of the given multilayer BD.

As described above, according to this preferred embodiment, by measuring the distance from the disc surface to the shallowest layer, multilayer discs are classified into a number of groups (e.g., three to four groups in this preferred embodiment). Also, according to the value of the address information that has been read from around the innermost location on the shallowest layer, the number of layers that are stacked one upon the other until the end of the shallowest layer is reached can be determined within the standardized group. As a result, it can be determined easily how many layers the disc loaded has (i.e., what is the number of layers stacked in that disc).

It should be noted that in a twenty-layer disc (such as a twenty-layer BD), those layers may be stacked so as to come toward, or go away from, the surface with respect to the reference layer (with a cover layer thickness of 100 μm). But even a twenty-layer disc may also be distinguished in the same way as in the group to which a sixteen-layer disc belongs.

Embodiment 4

Hereinafter, a fourth preferred embodiment of the present invention will be described.

According to this preferred embodiment, the grouping pattern shown in FIG. 15 is adopted. That is to say, the given multilayer disc is distinguished from the others of the same group by the distance between two information layers (i.e., the layer-to-layer pitch), instead of the distance from the disc surface to the shallowest information layer.

Generally speaking, the greater the number of information layers stacked in a single disc, the even shorter their layer-to-layer distance gets. For that reason, just by sensing the difference in the position (or the height) of an objective lens when an S-curve signal is detected from each of those information layers, sufficient accuracy cannot be achieved. That is why according to this preferred embodiment, the method in which the distance between information layers (i.e., their layer-to-layer distance) is measured is not adopted. Instead, according to this preferred embodiment, a focus is set on each of those information layers and the spherical aberration setting is optimized. Since the difference in associated spherical aberration between one information layer and its adjacent information layer corresponds to the layer-to-layer distance, the layer-to-layer distance can be obtained based on the difference in adjusted spherical aberration setting. And once the layer-to-layer distance is obtained, it can be determined accurately what group the disc loaded belongs to.

Figure 19:
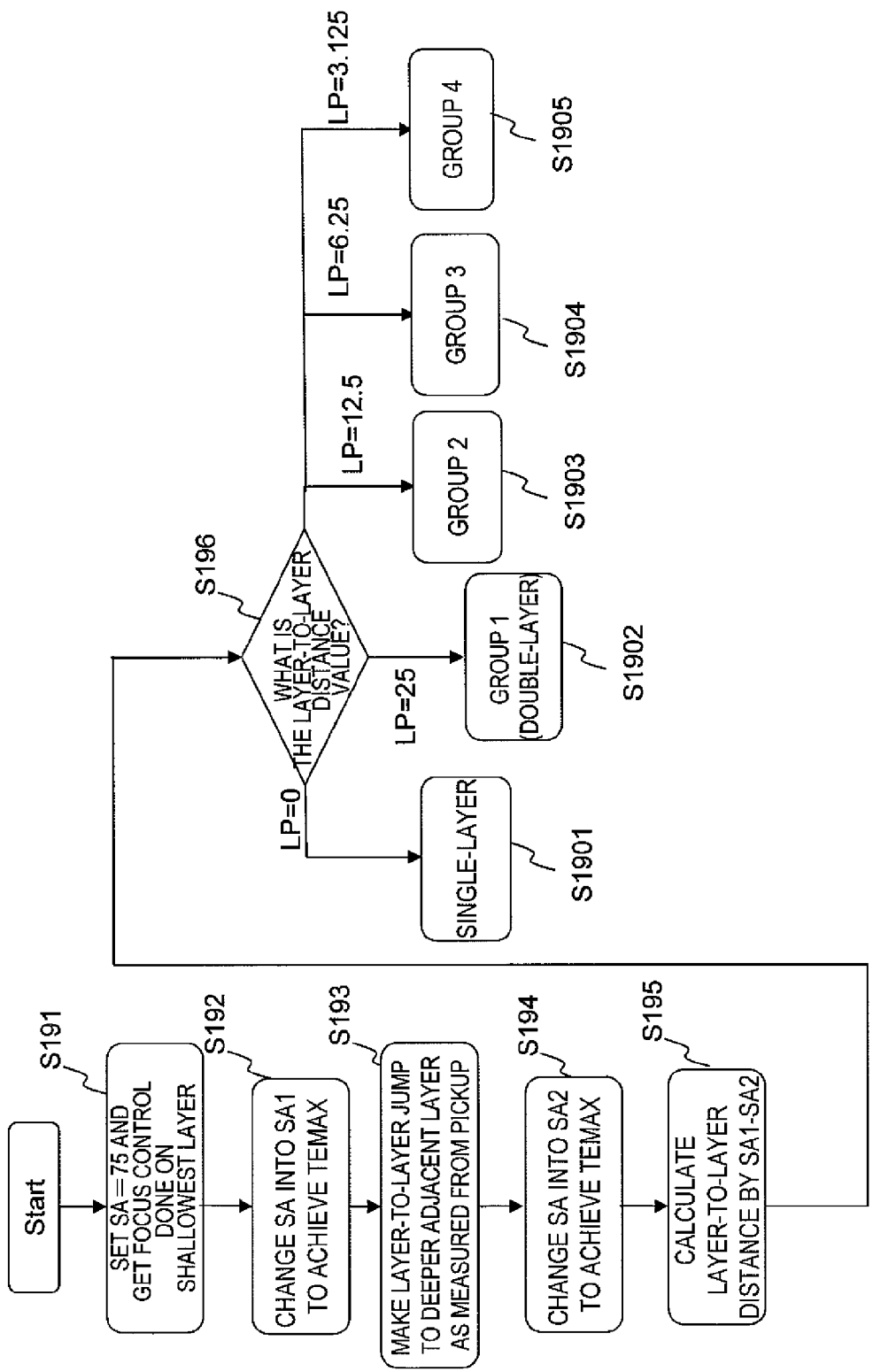
FIG. 19 is a flowchart showing the flow of a multilayer disc grouping process according to a fourth preferred embodiment of the present invention.

FIG. 19 is a flowchart showing the procedure of performing a grouping process by measuring the layer-to-layer pitch with spherical aberration settings for the respective layers compared to each other. Hereinafter, a multilayer disc distinguishing process will be described with reference to FIG. 19. The optical disc drive of the third preferred embodiment described above is also used in this preferred embodiment.

As shown in FIG. 19, when the drive is loaded with a single-layer, double-layer or multilayer BD, the spherical aberration SA is temporarily set in Step S191 to a predetermined value for the shallowest layer L2 of a double-layer BD, e.g., 75 µm when converted into a cover layer thickness, and a focus search operation is performed. The S-curve signal to be detected for the first time after the S-curve signal representing the disc surface has been detected as a result of the focus search operation represents the shallowest layer (e.g., the second layer L2 of a double-layer BD, the fourth layer L4 of a quadruple-layer BD, or the sixteenth layer L16 of a sixteen-layer BD) as shown in FIG. 4. That is why if the S-curve signal detected indicates that this is the shallowest layer, the focus control can get done easily on that layer.

Next, in Step S192, after the focus control has gotten done on the shallowest layer, the spherical aberration is adjusted so that the TE signal has the maximum amplitude on that shallowest layer. Based on that adjusted spherical aberration setting SA1, the depth of the shallowest layer on which the focus is currently set (which corresponds to the cover layer thickness) can be measured. Thereafter, in Step S193, the disc distinguishing section 260 shifts the focus from the shallowest layer to its adjacent information layer (which will be simply referred to herein as an "adjacent layer") by performing a focus jump operation.

Subsequently, in Step S194, the spherical aberration is adjusted so that the TE signal has the maximum amplitude on that adjacent layer. Based on that adjusted spherical aberration setting SA2, the depth of the adjacent layer on which the focus is currently set (which corresponds to the distance from the disc surface to the adjacent layer) can be measured.

In Step S195, the layer-to-layer distance is calculated based on SA1 and SA2. Next, in Step S196, the magnitude of the layer-to-layer distance LP calculated is compared to a predetermined value. If LP=0, the disc loaded is determined to be a single-layer BD (in Step S1901). If LP=25, the disc loaded is determined to belong to Group 1, i.e., to be a double-layer BD (in Step S1902). If LP=12.5, the disc loaded is determined to belong to Group 2 consisting of a triple-layer BD and a quadruple-layer BD (in Step S1903). If LP=6.25, the disc loaded is determined to belong to Group 3 consisting of a six-layer BD, a seven-layer BD and an eight-layer BD (in Step S1904). And if LP=3.125, the disc loaded is determined to belong to Group 4 consisting of a ten-layer BD, a fourteen-layer BD and a sixteen-layer BD (in Step S1905). In this manner, multilayer BDs can be grouped according to the pattern shown in FIG. 15.

In this case, the layer-to-layer distance is affected by some variation between individual discs and the accuracy of measurement, and therefore, LP does not become exactly equal to 25. That is why in comparing the layer-to-layer distance to a reference value, the decision is preferably made within the range of the predetermined value ±5 µm.

Hereinafter, it will be described how to carry out an intra-group distinguishing process according to this fourth preferred embodiment. According to the distinguishing method of the fourth preferred embodiment, the depth of the shallowest layer (i.e., the cover layer thickness) is determined by the spherical aberration setting that has been measured during the grouping process. And based on that shallowest layer thickness, it is determined which one of the BDs belonging to the same group the disc loaded is.

Figure 20:
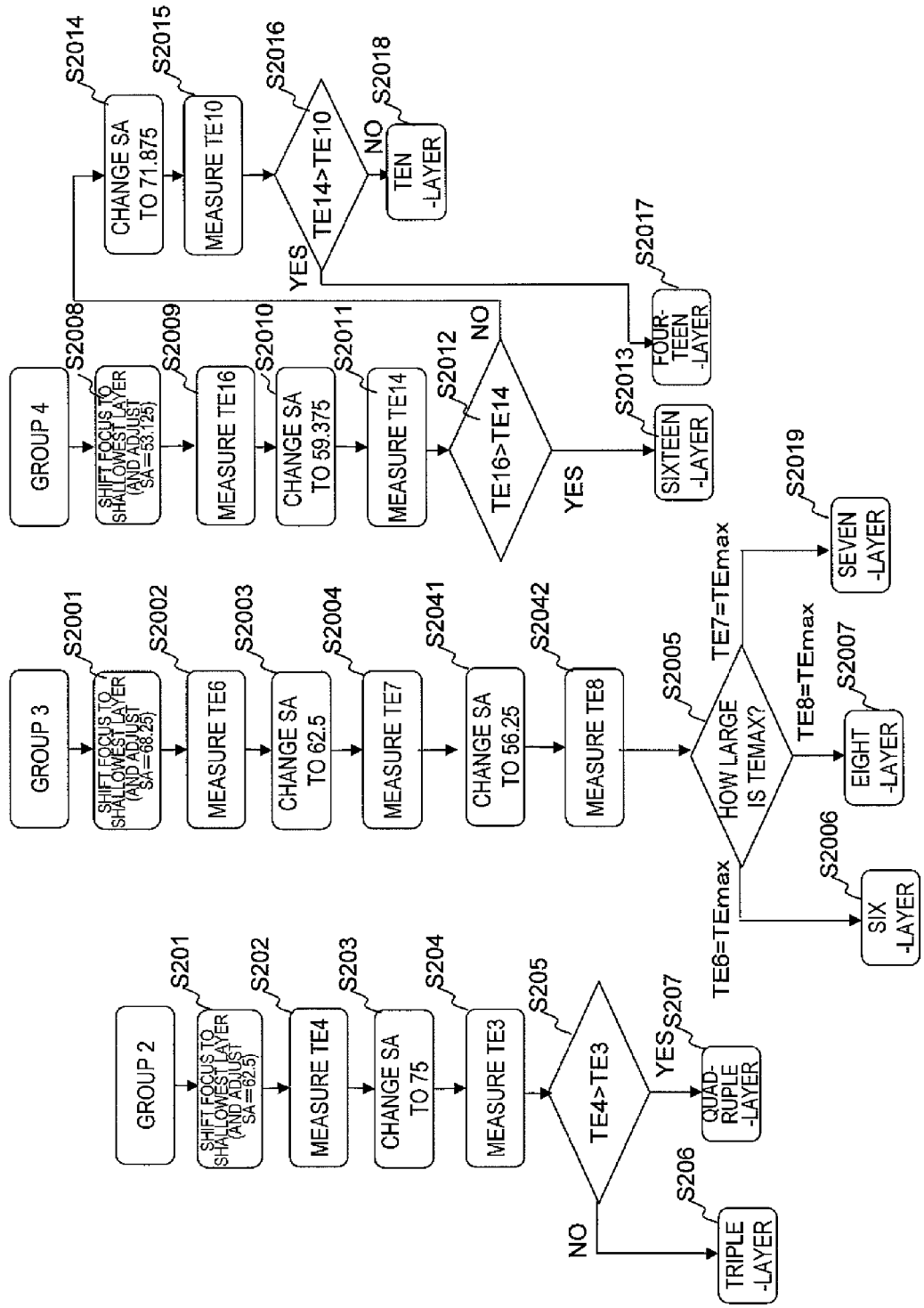
FIG. 20 is a flowchart showing an exemplary flow of an intra-group number-of-layers determining process according to the fourth preferred embodiment.

FIG. 20 is a flowchart showing the procedure of performing an intra-group distinguishing process by detecting how much the amplitude of a TE signal increases or decreases according to the spherical aberration setting and finding what spherical aberration setting maximizes the amplitude of the TE signal with respect to the shallowest layer.

In Group 2, the disc loaded is determined to be either a triple-layer BD or a quadruple-layer BD. In Group 3, the disc loaded is determined to be a six-layer BD, a seven-layer BD, or an eight-layer BD. And in Group 4, the disc loaded is determined to be a ten-, fourteen or sixteen-layer BD.

In Group 2, first of all, in Step S201, the focus is shifted from the adjacent layer to the shallowest layer, and a focus control is performed on that shallowest layer, thereby adjusting the spherical aberration setting to 62.5 µm when converted into the cover layer thickness of the shallowest layer L4. Next, in Step S202, the amplitude TE4 of the TE signal is measured in that state. Then, in Step S203, the spherical aberration setting is varied to 75 µm when converted into the cover layer thickness (or depth) of the shallowest layer L2 of a triple-layer BD. Subsequently, in Step S204, the amplitude TE3 of the TE signal is measured in that state.

Next, in Step S205, the amplitudes TE4 and TE3 of the TE signal are compared to each other. In that case, if the disc loaded is a triple-layer disc, then its cover layer thickness is 75 µm, and therefore, the TE signal amplitude TE3, to which the spherical aberration setting is adjusted, becomes greater than the TE signal amplitude TE4. On the other hand, if the disc loaded is a quadruple-layer disc, then its cover layer thickness is 62.5 µm, and therefore, the TE signal amplitude TE4, to which the spherical aberration setting is adjusted, becomes greater than the TE signal amplitude TE3. That is why if TE4≤TE3, then the disc loaded is determined to be a triple-layer BD in Step S206. But if TE4>TE3, the disc loaded is determined to be a quadruple-layer BD in Step S207. As a result, just by getting the focus control done (i.e., without getting the tracking control or address reading done), the disc belonging to this Group 2 can be easily determined to be either a triple-layer BD or a quadruple-layer BD.

As for Group 3, first of all, in Step S2001, the spherical aberration setting is adjusted to 68.25 µm when converted into the cover layer thickness of the shallowest layer L6 of a six-layer BD. Next, in Step S2002, the amplitude TE6 of the TE signal is measured in that state. Then, in Step S2003, the spherical aberration setting is varied to 62.5 µm when converted into the cover layer thickness of the shallowest layer L7 of a seven-layer BD. Subsequently, in Step S2004, the amplitude TE7 of the TE signal is measured in that state. Next, in Step S2041, the spherical aberration setting is varied to 56.25 µm when converted into the cover layer thickness of the shallowest layer L8 of an eight-layer BD. Subsequently, in Step S2042, the amplitude TE8 of the TE signal is measured in that state.

Thereafter, in Step S2005, the TE signal amplitudes TE8, TE7 and TE6 are compared to each other. In that case, if the disc Loaded is a six-layer disc, then its cover layer thickness is 68.25 μm, and therefore, the TE signal amplitude TE6, to which the spherical aberration setting is currently adjusted, becomes greater than the TE signal amplitude TE7 or TE8. As a result, of these three TE signal amplitudes, TE6=$TE_{max}$, and the disc loaded is determined to be a six-layer BD in Step S2006. On the other hand, if the disc Loaded is a seven-layer disc, then its cover layer thickness is 62.5 μm, and therefore, the TE signal amplitude TE7, to which the spherical aberration setting is currently adjusted, becomes greater than the TE signal amplitude TE6 or TE8. As a result, TE7=$TE_{max}$ and the disc loaded is determined to be a seven-layer BD in Step S2019. Furthermore, if the disc loaded is an eight-layer disc, then its cover layer thickness is 56.25 μm, and therefore, the TE signal amplitude TE8, to which the spherical aberration setting is currently adjusted, becomes greater than the TE signal amplitude TE6 or TE7. As a result, TE8=$TE_{max}$ and the disc loaded is determined to be an eight-layer BD in Step S2007.

As a result, just by getting the focus control done (i.e., without getting the tracking control or address reading done), the disc belonging to this Group 3 can be easily determined to be a six-layer BD, a seven-layer BD or an eight-layer BD.

Likewise, a series of similar processing steps S2008 through S2018 are also performed on Group 4. That is to say, spherical aberration settings are adjusted to respective values that have been converted into the cover layer thicknesses of the sixteen-, fourteen-, and ten-layer BDs and the amplitudes of the TE signals are measured in that state. After that, the respective measured values TE16, TE14 and TE10 are compared to each other, thereby determining the disc loaded to be one of sixteen-, fourteen-, and ten-layer BDs that belong to the same group.

As described above, according to each of the preferred embodiments of the present invention, the layer-to-layer distance (including the distance from the disc surface to the shallowest layer) is measured based on the interval between (the S-curve signals of) the FE signals or the corrected spherical aberration values. And after multilayer discs have been classified into several groups, the number of layers that the disc loaded has is determined by measuring the amplitude of a TE signal or reading address information with respect to the spherical aberration setting. That is why as long as the drive can detect the S-curve signals and has a mechanism for changing or adjusting the spherical aberration, the drive can use not only the patterns shown in FIGS. 10 to 16 but also any other patterns as well. In short, the present invention is applicable to any of various multilayer discs that should be producible according to currently available manufacturing technologies and is never limited to a multilayer disc with any particular number of information layers.

Embodiment 5

As next-generation BDs to replace single- and double-layer BDs, quadruple-layer BDs, as well as triple-layer BDs, are on the verge of going on the market. That is why it is preferred that the triple- and quadruple-layer BDs form the same group and be distinguished from the single- and double-layer BDs as shown in FIGS. 14 to 16. To make the triple- and quadruple-layer BDs form the same group, one of the following two design strategies may be adopted:
1) to make the triple- and quadruple-layer BDs have the same layer-to-layer pitch, which may be set to be 18 μm, for example; or
2) to make the respective shallowest layers L2 and L3 of the triple- and quadruple-layer BDs that are located closest to the disc surface have the same depth (i.e., the same cover layer thickness), which may be 55 μm, for example.

Generally speaking, if the reflectance of an information layer is increased, then the interlayer crosstalk will increase. That is why the interlayer crosstalk can be reduced more easily, and a multilayer disc could be designed more easily, by finely adjusting the layer-to-layer pitch with the cover layer thickness fixed between the groups rather than by fixing the layer-to-layer pitch between them.

According to this preferred embodiment, a single-layer BD is classified into Group 1, a double-layer BD is classified into Group 2, and triple- and quadruple-layer BDs are classified into Group 3. The BDs belonging to Group 3 are supposed to have substantially the same cover layer thickness. FIG. 21 is a table summarizing the specifics of Groups 1, 2 and 3 according to this preferred embodiment.

In order to reduce the interlayer crosstalk and optimize the transmittance, the layer-to-layer pitch is preferably finely adjusted. The triple-layer BD may have a cover layer thickness of 57 μm±5 μm and the quadruple-layer BD may have a cover layer thickness of 54.5 μm±5 μm, for example. The center value of the actual cover layer thickness may be somewhat different from the design value as long as there is a significant difference from the cover layer thickness for any other group. If another group of discs of the next generation has been newly added, then that new group may have a different minimum layer-to-layer pitch from the other groups'. And by detecting that minimum layer-to-layer pitch, that new group can be distinguished from the others.

Hereinafter, a preferred embodiment of a method for distinguishing the group consisting of triple-layer and quadruple-layer BDs from the group consisting of single-layer and double-layer BDs that have already been put on the market will be described.

FIG. 22 is a table summarizing the specifications of conventional single-layer and double-layer discs and triple-layer and quadruple-layer discs according to fifth and sixth preferred embodiments of the present invention.

When the Blu-ray Disc was developed, a "single-sided" double-layer disc, from/on which data is read or written by irradiating each of multiple information layers with light that has been transmitted through a single disc surface (i.e., a single side), was provided from the beginning. Unlike a double-sided disc, even if a single optical pickup is used, there is no need to flip the single-sided disc over during a read/write operation, and therefore, the write operation can be performed on it continuously for a longer time. For that reason, single-sided versions of triple-layer and quadruple-layer discs have been developed to be mainstream products in the near future. To extend the long continuous recording time, which is one of the principal features of such single-sided multilayer discs, as much as possible, a triple-layer BD is being designed so as to achieve a storage capacity of 33 GB per layer and an overall storage capacity of approximately 100 GB and a quadruple-layer BD is being designed so as to achieve a storage capacity of 32 GB per layer and an overall storage capacity of 128 GB. That is to say, the triple-layer and quadruple-layer BDs have slightly different data storage capacities per layer in order to secure a power margin during a write operation. And the data writing linear density is changed so as to achieve an exactly unitary figure. As used herein, the "linear density" of data writing refers to the density (i.e., the number of bits) of data to be written on a track with a unit length.

Figure 23:
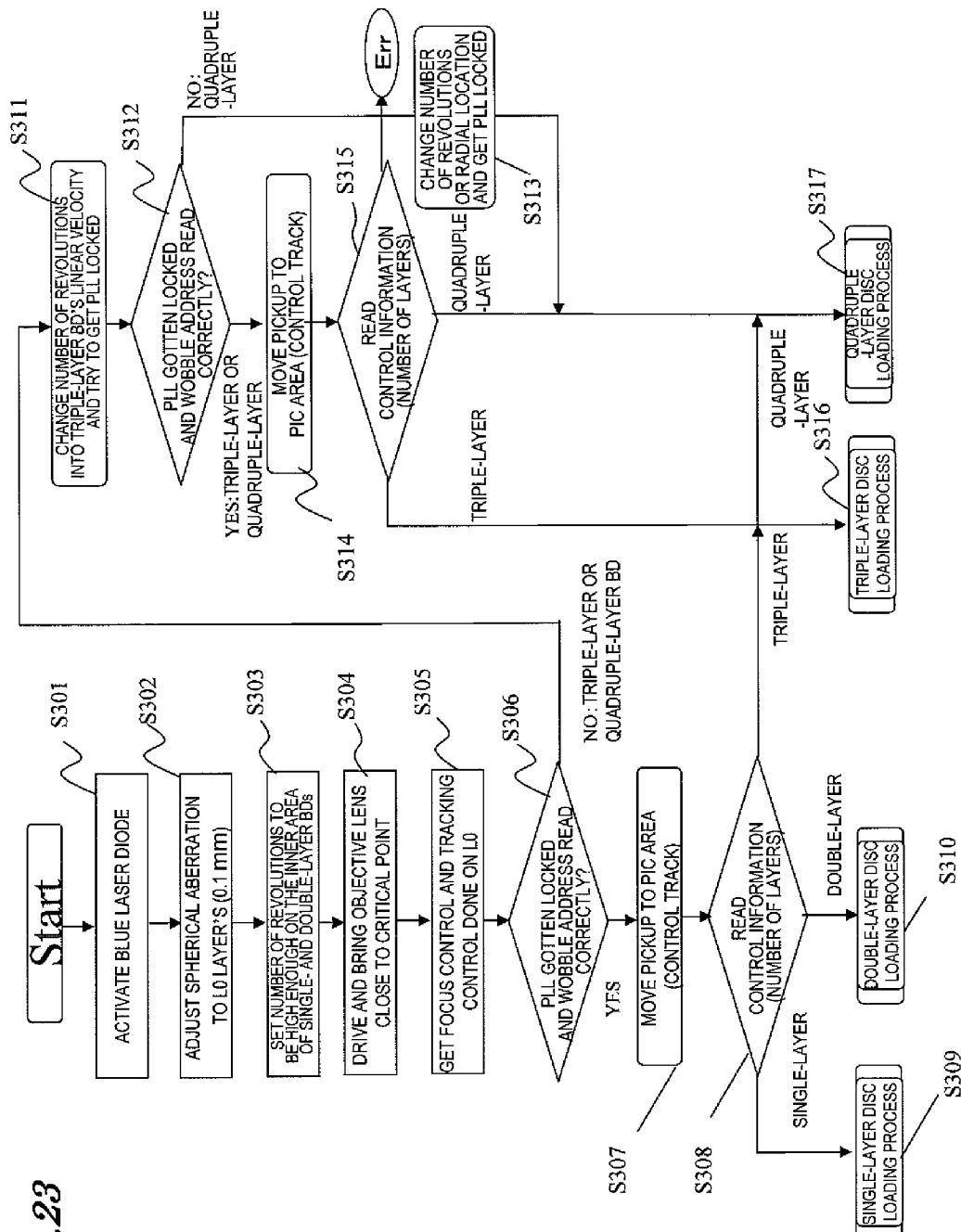
FIG. 23 is a flowchart showing the procedure of a disc distinguishing process according to the fifth preferred embodiment.

Hereinafter, it will be described with reference to FIG. 23 how to distinguish the group consisting of triple-layer and quadruple-layer BDs, the group consisting of single-layer BDs and the group consisting of double-layer BDs from each other and how to distinguish a triple-layer BD from a quadruple-layer BD in the same group.

First of all, in Step S301, a blue laser diode starts to be driven, thereby irradiating the given optical disc with a light beam for BDs. Next, in Step S302, the spherical aberration is set to be a value associated with the reference layer (i.e., L0 layer). Then, in Step S303, the number of revolutions of the motor is set to be high enough to achieve a target linear velocity on the inner area on the optical disc. In this example, the number of revolutions is adjusted to the one for single-layer and double-layer BDs. This point will be described in detail below.

As shown in FIG. 22, single-layer and double-layer BDs both have a storage capacity of 25 GB per layer, while triple-layer and quadruple-layer BDs have a storage capacity of approximately 32 GB per layer. That is why the triple-layer and quadruple-layer BDs have a higher data density (linear density) than the single-layer and double-layer BDs. Consequently, the triple-layer and quadruple-layer BDs have a lower linear velocity than the single-layer and double-layer BDs. In every one of these optical discs, an information layer as a reference layer L0 is located at a depth of 0.1 mm under the disc surface. For that reason, according to this preferred embodiment, the number of revolutions is initially set to be the linear velocity for single-layer and double-layer BDs as described above. Specifically, at a radial location of 25 mm, the target linear velocity can be achieved by setting the number of revolutions to be approximately 1,880 rpm.

Next, in Step S304, the objective lens is raised to the critical point and driven so as to come as close to the optical disc as possible. Thereafter, in Step S305, the focus and tracking servo controls are turned ON with respect to the reference layer (i.e., L0 layer). Then, the PLL gets locked to a wobble frequency that has been detected from the reference layer (L0 layer), thereby performing the operation of reading a wobble address.

If it has been determined in Step S306 that any wobble address has been read successfully, then the disc loaded can be determined to be either a single-layer BD or a double-layer BD. In that case, the process advances to Step S307. Specifically, the optical pickup is moved to a PIC area (control track) on the innermost part of the optical disc. Then, in Step S308, the BOOK type, the number of layers, and other kinds of control information are read from the disc loaded, thereby determining whether the disc loaded is a single-layer BD or a double-layer BD. After that, the process advances to their respective disc loading processes in Step S309 and S310.

On the other hand, unless the PLL can get locked (i.e., if no wobble address can be read) in Step S306 with the number of revolutions for single-layer and double-layer BDs or if the number of revolutions of the motor decreases when the PLL gets locked, the disc loaded can be determined to be either a triple-layer BD or a quadruple-layer BD.

In this manner, even if the PLL cannot get locked, the disc loaded can still be presumed exclusively to be a triple-layer BD or a quadruple-layer BD. In that case, the number of revolutions is decreased in Step S311 from 1,880 rpm to 1,424 rpm at a radial location of 25 mm so as to be a linear velocity for a triple-layer BD and then the drive attempts to get the PLL locked. Thereafter, in Step S312, if it has been determined that the PLL has gotten locked and the wobble address has been read at that number of revolutions, then the disc loaded turns out to be either a triple-layer BD or a quadruple-layer BD. It should be noted that even if the disc loaded is a quadruple-layer BD, there is a good chance that the PLL gets locked in Step S311. If the PLL gets locked with respect to a quadruple-layer BD, the motor is controlled so as to follow up with the rotation of that disc and its number of revolutions slightly increases from 1,424 rpm to 1,468 rpm. Thus, by sensing that slight increase, the disc loaded can be determined to be a quadruple-layer BD. Unless the PLL can get locked in Steps S311 and S312 at a number of revolutions of 1,424 rpm, the wobble address can be easily read from the quadruple-layer BD after the PLL has gotten locked in Step S313 with the number of revolutions increased to 1,468 rpm.

If the disc loaded is determined in Step S312 to be either a triple-layer BD or a quadruple-layer BD, the optical pickup moves in Step S314 to the PIC area and then the BOOK type, the number of layers, and other kinds of control information are read in Step S315 from the disc loaded. In this processing step, a final decision is made by reference to the control information about whether the disc loaded is a triple-layer BD or a quadruple-layer BD, and then the process advances to their respective disc loading processes in Steps S316 and S317. If it has turned out, as a result of this series of processing steps, that the number of layers of the disc loaded does not match its associated linear velocity, then the disc loaded should be a bootleg or any other disc that fails to meet the standards. Thus, the disc loading process should be stopped immediately in that case.

On the other hand, if the PLL cannot get locked even when the disc distinguishing process is retried with the linear velocity set to be a number of revolutions for a triple-layer or quadruple-layer BD, then the disc loaded should be an irregular disc or a disc in bad condition. In that case, an error message may be displayed and the disc loading process may be stopped.

Embodiment 6

Hereinafter, a sixth preferred embodiment of the present invention will be described.

The optical disc drive of this sixth preferred embodiment gives a top priority to one of its compatible BDs that has a larger number of layers than any other one of the BDs during the disc loading process, which is a major difference from the fifth preferred embodiment described above. If the given BD is a multilayer disc, then the servo operations and spherical aberration and power learning processes need to be carried out on a layer-by-layer basis. That is why it is preferred that a BD with the largest number of layers be distinguished earlier than any other BD.

Figure 24:
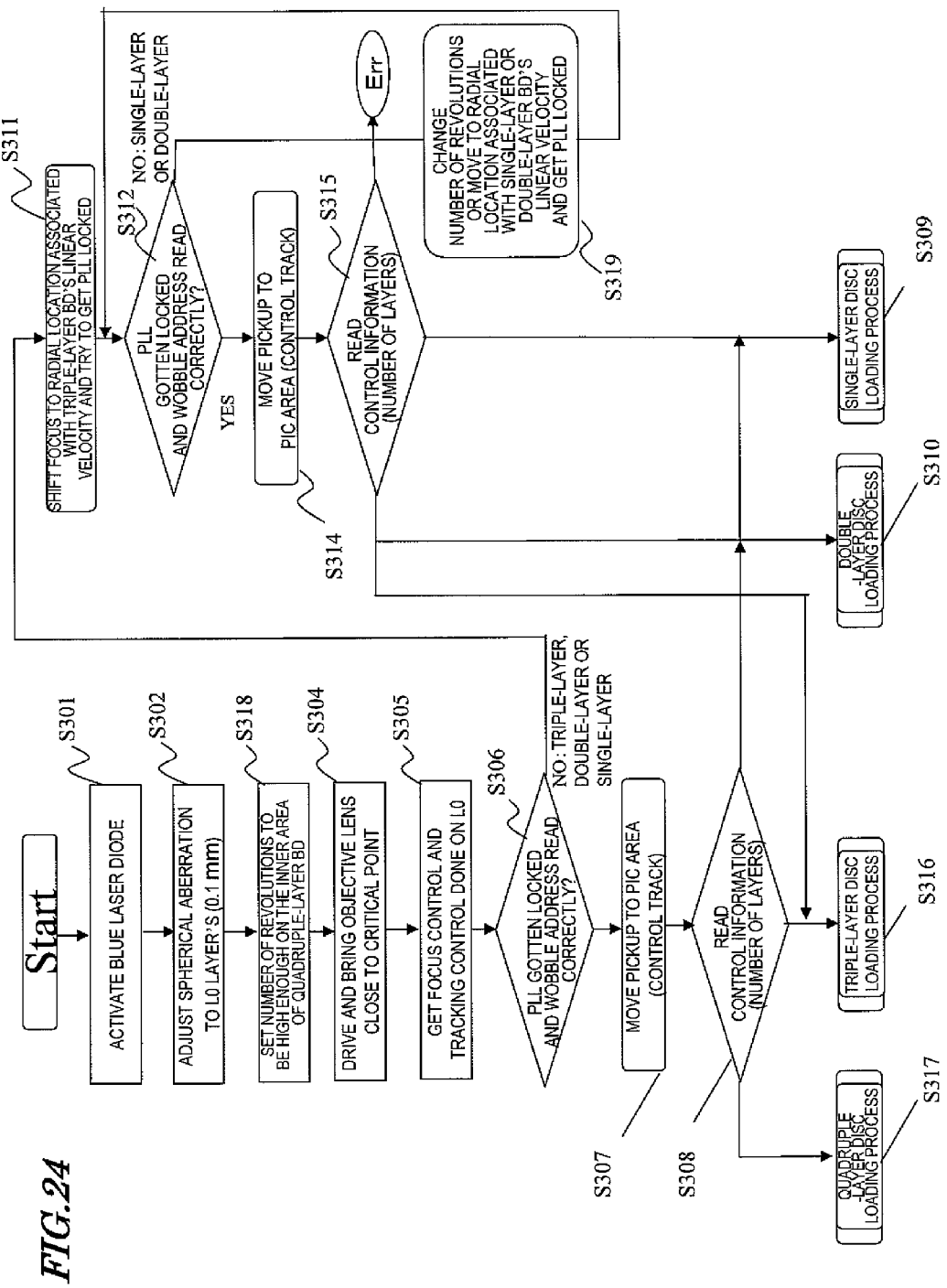
FIG. 24 is a flowchart showing the procedure of a disc distinguishing process according to the sixth preferred embodiment.

Hereinafter, this sixth preferred embodiment will be described with reference to FIG. 24, in which every processing step but Steps S318 and S319 is basically the same as its counterpart of the preferred embodiment shown in FIG. 23. Thus, in FIG. 24, each of those similar processing steps corresponding to the ones shown in FIG. 23 is identified by the same reference numeral as what is used in FIG. 23.

First of all, as in the fifth preferred embodiment described above, the processing steps S301 and S302 are performed. According to this preferred embodiment, when the grouping process is started, the number of revolutions of the motor is set in Step S318 so as to be a linear velocity for a quadruple-layer BD. For example, the number of revolutions at a radial location of 25 mm in the inner area may be set to be 1,468 rpm. And then the processing steps S304 to S306 are performed.

In Step S306, if the PLL can get locked at a wobble frequency detected and if the wobble address can be read as it is, then the disc loaded can be determined to be a quadruple-layer BD. On the other hand, even if the disc loaded is a triple-layer BD but if the PLL can get locked, then the motor is controlled so as to follow up with the rotation of that disc and its number of revolutions slightly increases to around 1,424 rpm. As a result, the disc loaded can be quickly determined to be a triple-layer BD or a quadruple-layer BD.

Thereafter, in Step S307, the optical pickup is moved to a PIC area (control track) on the innermost part of the optical disc. Then, in Step S308, the BOOK type, the number of layers, and other kinds of control information are read from the disc loaded. After that, the process advances to the triple-layer BD and quadruple-layer BD loading processes in Step S316 and S317.

Unless the PLL can get locked in Step S306, the number of revolutions may be reset to 1,424 rpm as in the fifth preferred embodiment described above so as to be a linear velocity for a triple-layer BD and then the process may advance to Step S312. In this preferred embodiment, the pickup is moved inward in Step S311 by about 0.75 mm from a radial location of 25 mm in the inner area to a radial location of 24.75 mm, at which the triple-layer BD has a number of revolutions of 1,468 rpm. That is why the wobble PLL can get locked at that location even without changing the number of revolutions of the motor. If the PLL can get locked and the wobble address can be read in Step S312 after the optical pickup has been moved as described above, the optical disc loaded can be determined to be a triple-layer BD.

Even if the optical disc loaded is a single-layer BD or a double-layer BD, the PLL can still get locked in some cases. Nevertheless, if the PLL can get locked with respect to a single-layer BD or a double-layer BD, then the number of revolutions of the motor will rise to around 1,880 rpm in response. That is why it can be determined by the number of revolutions of the motor whether the disc loaded is a single-layer BD or a double-layer BD.

Unless the PLL can get locked in Steps S311 and S312 at a number of revolutions of 1,468 rpm for a quadruple-layer BD, the number of revolutions of the motor is changed in Step S319 into 1,880 rpm for a single-layer BD and a double-layer BD. And then the PLL may get locked and the wobble address may be read. Alternatively, if the pickup is moved from a radial location of 25 mm to another radial location of 32 to 33 mm by changing the number of revolutions of the motor, then the PLL can get locked because 1,468 rpm is the target number of revolutions for a single-layer BD and a double-layer BD at that radial location. Thus, by reading the wobble address there, the disc loaded is determined to be either a single-layer BD or a double-layer BD. On the other hand, if the wobble address can be read in Step S312, the optical pickup is moved in Step S314 to a PIC area (control track) on the innermost part of the optical disc. Then, the BOOK type, the number of layers, and other kinds of control information are read from the optical disc loaded, thereby making a final decision about whether the disc loaded is a single-layer BD or a double-layer BD. After that, the process advances to their respective disc loading processes in Step S309 and S310. In this manner, even if the number of revolutions of the motor is not changed or if the pickup is moved toward an outer or inner area on the optical disc, the PLL can still be locked and the optical disc loaded can still be distinguished.

In the preferred embodiment described above, the number of revolutions of the motor is set in Step S318 so as to be a linear velocity for a quadruple-layer BD. However, this is only an example of the present invention. Alternatively, the number of revolutions of the motor may also be set to be a linear velocity for a triple-layer BD.

Embodiment 7

Hereinafter, a seventh preferred embodiment of the present invention will be described.

Figure 25:
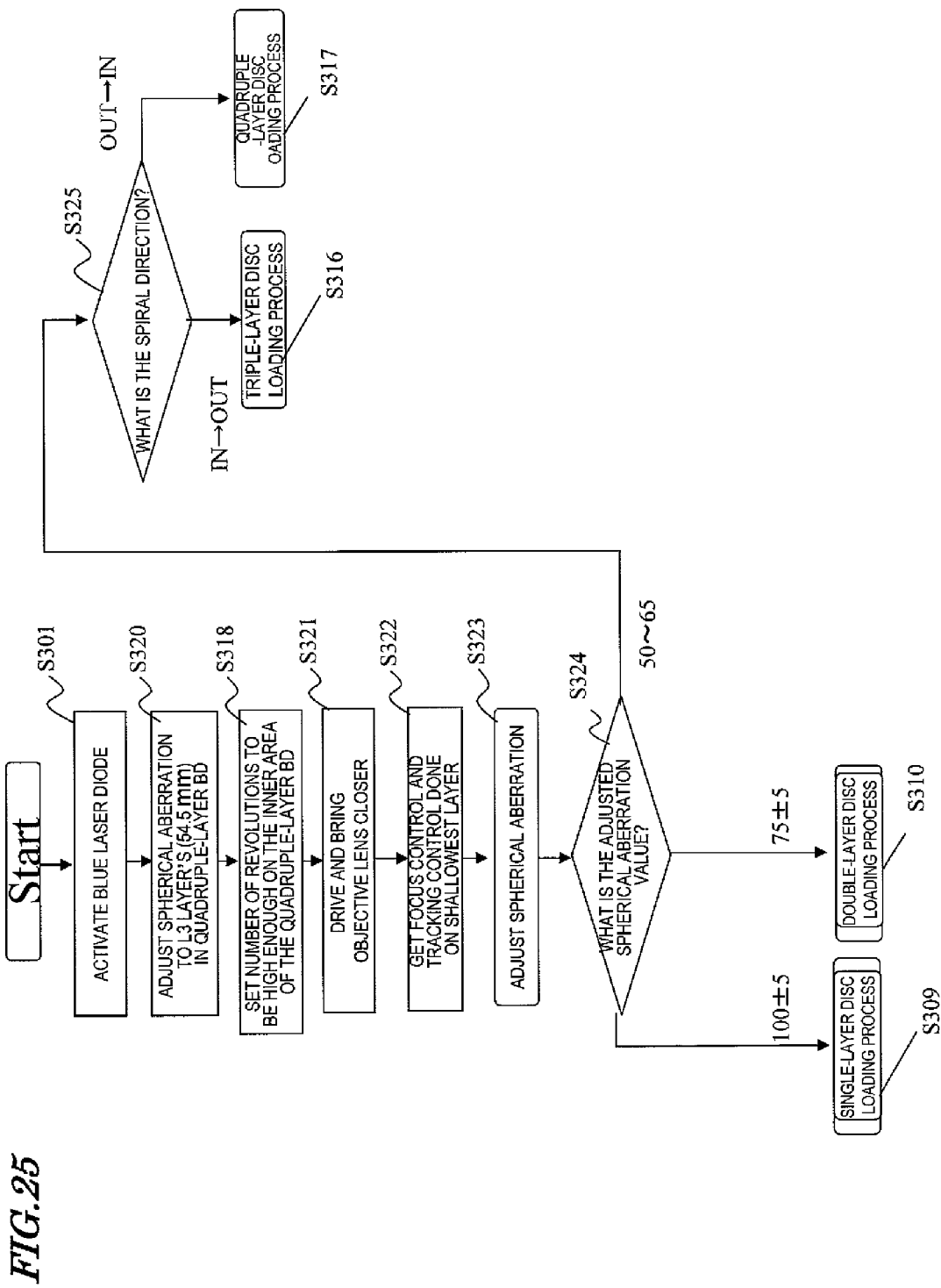
FIG. 25 is a flowchart showing the procedure of a disc distinguishing process according to a seventh preferred embodiment of the present invention.

FIG. 25 is a flowchart showing a procedure in which a disc loaded is distinguished according to this preferred embodiment during the disc loading process. FIG. 26 is a table summarizing the specifications of a triple-layer BD and a quadruple-layer BD. Hereinafter, this seventh preferred embodiment of the present invention will be described with reference to FIGS. 25 and 26.

This seventh preferred embodiment is another modified example of the fifth preferred embodiment of the present invention described above. According to this preferred embodiment, first of all, after the processing step S301 has been performed, the spherical aberration setting is adjusted in Step S320 to 54.5 μm that is the cover layer thickness of a quadruple-layer BD, which is thinner than that of any other one of the optical discs compatible with the optical disc drive.

Next, in Step S318, the number of revolutions of the motor is set so as to achieve a linear velocity for a quadruple-layer BD on the inner area of the optical disc. Then, in Step S321, the objective lens is driven so as to come as close to the shallowest layer as possible.

Subsequently, in Step S322, the PLL starts to get locked, and the focus and tracking servo controls are also started, on the shallowest layer. In this case, if the PLL can get locked, then the spherical aberration is adjusted in Step S323 so that the amplitude of the TE signal becomes $TE_{max}$. Although the spherical aberrations are variable from one optical disc to another, the average spherical aberrations that are converted into cover layer thicknesses are 54.5 μm, 57.5 μm, 75 μm and 100 μm for quadruple-layer, triple-layer, double-layer and single-layer BDs, respectively. If a spherical aberration value that maximizes the amplitude of the TE signal on the shallowest layer is obtained, then the disc loaded can be determined, by using that spherical aberration value in Step S324, to be a single-layer BD (belonging to Group 1), a double-layer BD (belonging to Group 2) or a triple- or quadruple-layer BD (belonging to Group 3).

If the optical disc loaded has turned out to belong to Group 3, the spiral direction of the optical disc is detected in Step S325 according to this preferred embodiment, thereby determining whether the optical disc loaded is a triple-layer BD or a quadruple-layer BD. Hereinafter, this point will be described in detail.

The spiral direction of the tracks on the shallowest layer L2 of a triple-layer BD is different from that of the tracks on the shallowest layer L3 of a quadruple-layer BD. That is why by detecting the direction in which the optical pickup is moving after the tracking control has been established (i.e., the spiral direction of the tracks), the optical disc loaded can be determined to be a triple-layer BD or a quadruple-layer BD. Specifically, as for a triple-layer BD, the optical pickup is moving along the spiral tracks from some inner location on the optical disc toward the outer edge of the disc (which direction will be referred to herein as "spiral: IN→OUT"). On the other hand, as for a quadruple-layer BD, the optical pickup is moving along the spiral tracks from some outer location on the optical disc toward the inner edge of the disc (which direction will be referred to herein as "spiral: OUT→IN"). Thus, by the moving direction of the optical pickup during the tracking operation, triple-layer and quadruple-layer BDs can be distinguished from each other.

Next, it will be described by way of a specific example exactly how to detect the moving direction of the optical pickup.

Figure 27:
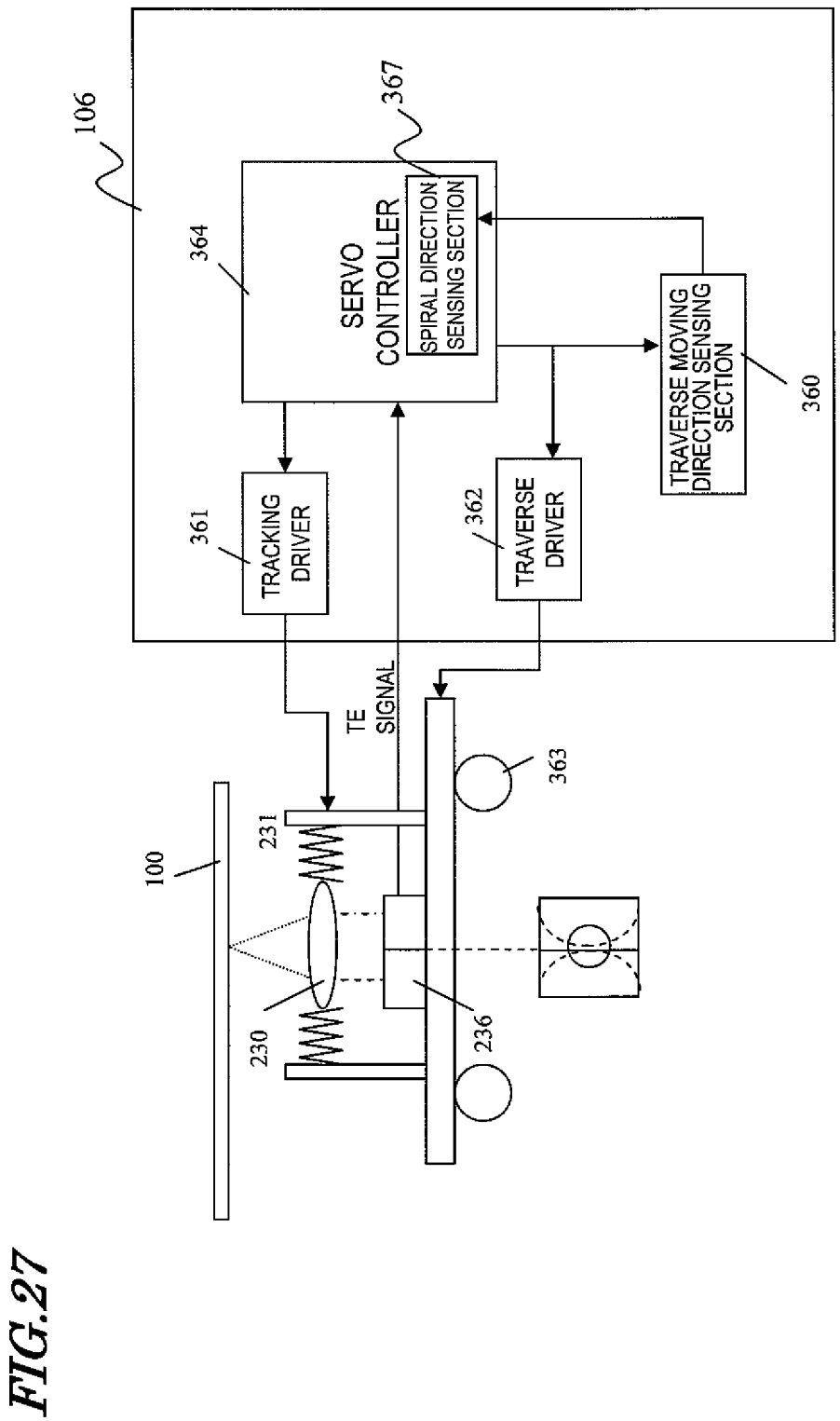
FIG. 27 is a block diagram illustrating a portion of the optical disc drive that performs a traverse operation.

FIG. 27 is a block diagram illustrating a tracking actuator 231 for driving an objective lens 230 in the tracking direction and its associated circuit components.

A tracking drive signal that has been output from a servo controller 364 is subjected to either current amplification or PWM modulation by a tracking driver 361 and then supplied to the tracking actuator 364. The light that has been reflected from the disc 100 is received by a double photodetector 236, which performs a push-pull detection by detecting a difference in intensity between ±first-order diffracted light beams due to diffraction caused by the tracks and thereby generates a tracking error (TE) signal.

A tracking error signal is a signal representing the magnitude of a radial shift of a light beam from the tracks. Thus, the tracking error signal is input to the servo controller 364. In response to the tracking error (TE) signal, the servo controller 364 performs a digital filter operation, thereby getting low-frequency-range compensation and phase compensation done and generating a tracking control signal.

The tracking driver 361 subjects the signal supplied from the servo controller 364 to current amplification for linear driving and modulation for PWM driving.

The tracking actuator 364 drives the objective lens 230 in accordance with the tracking drive signal that has been supplied from the tracking driver 361, thereby scanning the tracks with a light beam.

After having been subjected to band-pass filtering (i.e., having had its high-frequency components filtered out), the tracking control signal that has been output from the servo controller 364 is also supplied to a traverse driver 362. As the objective lens 230 follows the spiral tracks on the optical disc, the objective lens 230 moves either from some inner location on the optical disc toward the outer edge thereof or from some outer location on the optical disc toward the inner edge thereof. As a result, the center of the objective lens 230 gradually deviates from that of the photodetector 236. To eliminate that deviation, the traverse driver 362 that has received the tracking control signal outputs a traverse drive signal, thereby getting the optical pickup itself, on which the objective lens 230 is mounted, transported by the traverse motor 363.

By detecting the polarity of the drive signal for the traverse motor 363, the moving direction of the objective lens 230 (i.e., the spiral direction of the tracks) can be detected.

Figure 28:
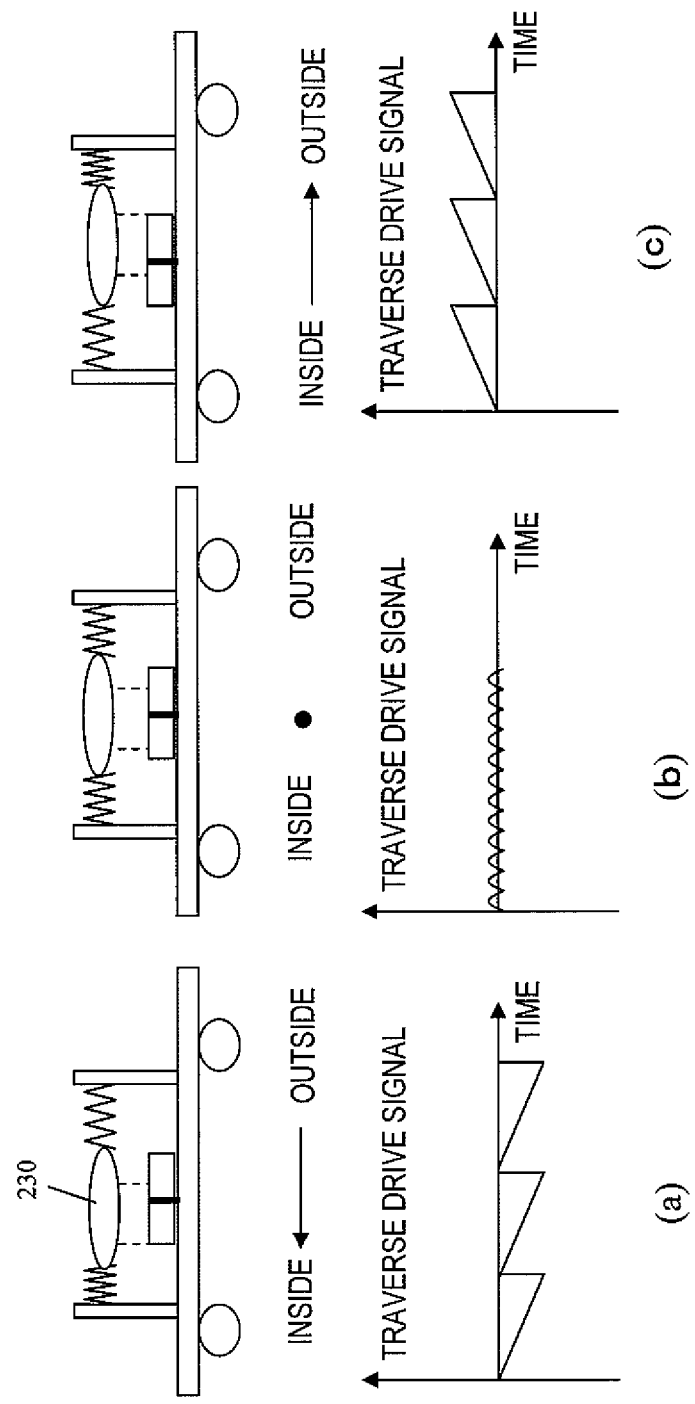
FIG. 28 illustrates a relation between the spiral direction on an optical disc and the traverse direction.

FIGS. 28(a) to 28(c) illustrate how the waveform of the traverse drive signal changes as the light beam spot moves in the spiral direction and when the light beam spot is stopped on a particular track. Specifically, FIG. 28(a) illustrates a situation where the spiral direction is inward. In that case, as the light beam follows the tracks, the light beam spot moves from some outer location on the optical disc toward the inner edge thereof. Then, the drive signal for the traverse motor 363 has the absolute value of its voltage (or current) increased on the negative side. And when the absolute value of the drive signal exceeds some voltage value (or current value) and when the traverse motor 363 starts to move in the same direction as the objective lens 230 in response, the drive signal goes around zero again. After that, as the objective lens 230 moves outward, the absolute value of the voltage (or current) increases again on the negative side and produces the same response again.

On the other hand, FIG. 28(c) illustrates a situation where the spiral direction is outward. In that case, as the light beam follows the tracks, the light beam spot moves from some inner location on the optical disc toward the outer edge thereof. Then, the drive signal for the traverse motor 363 has the absolute value of its voltage (or current) increased on the positive side. And when the drive signal exceeds some voltage value and when the traverse motor 363 starts to move in the same direction as the objective lens 230 in response, the drive signal goes around zero again. After that, as the objective lens 230 moves inward, the absolute value of the voltage (or current) increases again on the positive side and produces the same response again.

FIG. 28(b) illustrates the waveform of the traverse drive signal when the light beam spot stands still on a predetermined track. In that case, the light beam hardly moves either outward or inward and the objective lens 230 follows the eccentricity of the optical disc. Consequently, only the residual of that very little eccentricity is present on the traverse drive signal.

Now look at FIG. 27 again. A traverse moving direction sensing section 360 performs either sampling or integration on the drive signal for the traverse motor 363. If the sampled or integrated value is negative, then it can be seen that the light beam spot is moving from some outer location on the optical disc toward the inner edge thereof. On the other hand, if the sampled or integrated value is positive, then it can be seen that the light beam spot is moving from some inner location on the optical disc toward the outer edge thereof. In any case, the result of the decision is provided to the servo controller 364. A spiral direction sensing section 367 can determine whether the optical disc loaded is a triple-layer BD or a quadruple-layer BD.

As described above, according to the method of detecting the spiral direction of this preferred embodiment, it can be determined whether the optical disc loaded has an odd number of information layers or an even number of information layers.

To perform a read/write operation seamlessly on multiple layers, a multilayer DVD or BD adopts an opposite path arrangement. For example, if the PLL gets locked on the shallowest layer and if the spiral direction on that layer is detected, it can be determined whether the disc loaded is either a single- or triple-layer disc (with an odd number of layers) or a double- or quadruple-layer disc (with an even number of layers). That is why if that information and information about the reflectance obtained from the amplitude value of an FE or TE signal or information about the cover layer thickness obtained from the adjusted spherical aberration value are used in combination, it can be determined very easily and accurately whether the disc loaded is either a single- or triple-layer disc or a double- or quadruple-layer disc.

The method of this preferred embodiment for determining whether the number of information layers stacked in an optical disc is an odd number or an even number does not always have to be carried out as described above. Rather this method is broadly applicable as an optical disc distinguishing method for distinguishing an N-layer optical disc with N information layers (where N is an integer that is equal to or greater than three) from an (N+1)-layer optical disc with (N+1) information layers. Also, the optical disc to use does not have to be a BD. Furthermore, the information layer to be irradiated with light in order to detect the spiral direction of the tracks does not have to be the shallowest layer, either. Optionally, the spiral direction may also be detected on an information layer that is located adjacent to either the shallowest layer or the deepest information layer.

As the layer-to-layer pitch gets even narrower with a further increase in the number of layers stacked, a PLL to get locked on the target layer or a layer-to-layer jump to the target layer may fail and may get targeted on an adjacent layer by mistake. Even so, if the method of detecting the moving direction by a traverse voltage as described above is applied, that erroneous operation can be detected.

It should be noted that if a focus control using settings for a quadruple-layer BD is too unstable to get established on any layer, then there is a good chance that the disc loaded is not a quadruple-layer BD. That is why in that case, the focus control is preferably retried with settings for a triple-layer BD adopted and if that does not work again, then the settings are preferably changed again into ones for a double-layer BD, and then ones for a single-layer. As the PLL is supposed to be locked on the shallowest layer in such a situation, there is very little risk that the objective lens collides against the optical disc.

In the fifth through seventh preferred embodiments of the present invention described above, the optical disc is supposed to be driven at a BD's standard velocity 1×(corresponding to a rate of 36 Mbps). However, the present invention is in no way limited to those specific preferred embodiments. Alternatively, even if the standard number of revolutions of the optical disc during the disc loading process is 2× velocity (corresponding to a rate of 72 Mbps) or 4× velocity (corresponding to a rate of 144 Mbps), the present invention is also easily applicable just by determining various settings with the number of revolutions multiplied by n.

As can be seen from the foregoing description, the present invention is effectively applicable to an optical disc drive that is compatible with single-layer, double-layer, triple-layer and quadruple-layer BDs.

As for BDs, its optical disc drive must have a spherical aberration correction mechanism even though such a mechanism is not required for a DVD drive. In BDs, the focus can be set on a target information layer with the spherical aberration corrected, and therefore, the number of layers stacked in a ED can be increased more easily than in a DVD. Currently, specific standards are being set up for triple-layer and quadruple-layer BDs so that those multilayer BDs are ready to go on the market sometime soon.

Although double-layer DVDs have two different spiral track arrangements (i.e., a parallel path arrangement and an opposite path arrangement), BDs adopt only the opposite path arrangement. Just like the single-layer and double-layer discs that have already gone on the market and the triple-layer and quadruple-layer discs that are going to go on the market next, a group consisting of an optical disc with an odd number of layers and an optical disc with an even number of layers will go on the market one generation after another. To such a situation, the intra-group distinguishing method of the seventh preferred embodiment described above will be applicable very effectively. This is because in two different multilayer optical discs belonging to the same group, the spiral direction on the shallowest layer should always be inward (i.e., from the outer edge toward the inner edge) in a disc with an even number of layers and outward (i.e., from the inner edge toward the outer edge) in a disc with an odd number of layers. Such spiral direction detection can be easily done even without providing any special additional member for the optical disc drive.

The end of the data area on the shallowest layer is located in the innermost part of a disc with an even number of layers and in the outermost part of a disc with an odd number of layers. That is why just by comparing the address that has been read from the innermost or outermost part of a disc to the maximum physical address of a triple-layer disc (i.e., a disc with an odd number of layers) or a quadruple-layer disc (i.e., a disc with an even number of layers) to distinguish, it can also be determined easily whether the disc loaded has an odd number of layers or an even number of layers.

Optionally, even by reading addresses in the spiral direction from two points on a particular information layer and determining whether the addresses increase or decrease, the spiral direction on that information layer can also be detected.

By making such decisions in two stages on the disc loaded as in the present invention, a new generation of discs can be supported and compatibility with discs of the past can be maintained without significantly changing, but while using effectively, the conventional software or middleware. As described above, according to the present invention, the disc loaded is subjected to the first-stage disc grouping process of determining whether the disc loaded belongs to the existent generation (which may consist of single-layer and double-layer discs, for example) or a new generation (which may consist of triple-layer and quadruple-layer discs, for example). After that, the disc is subjected to the second-stage disc distinguishing process of determining how many layers the disc loaded has in each of the existent and new generations (i.e., whether the disc is a single-layer disc or a double-layer disc and whether the disc is a triple-layer disc or a quadruple-layer disc).

The decision of the present invention can be made without significantly changing the conventional disc loading process. That is why even a recorder or player that is compatible with only single-layer and double-layer BDs may carry out the decision process of the present invention when loaded with a triple-layer or quadruple-layer BD of the new generation. That is to say, even if the recorder or player cannot perform a read/write operation on the triple-layer or quadruple-layer BD, it is still preferred that the recorder or player perform the first-stage disc grouping process on the shallowest layer of the optical disc loaded to determine whether the disc loaded belongs to the existent generation or the new generation. Then, even if the recorder or player is loaded with a non-compatible triple-layer or quadruple-layer BD, the recorder or player can eject the optical disc quickly and appropriately. That is to say, the grouping process of the present invention is applicable in common as a piece of software to optical discs of each and every generation.

On top of that, according to the spiral direction detection method adopted in the present invention, as long as a tracking control can be performed, there is no need to read any address from the optical disc loaded. That is why if the focus search or focus jump operation on an odd-numbered layer of a multilayer disc has failed and if the focal point has reached the next even-numbered layer by mistake (or vice versa), it can be seen immediately that the spiral direction detected is opposite to that of the target layer, and therefore, the error can be detected quickly.

INDUSTRIAL APPLICABILITY

The present invention is applicable to an optical disc drive that is compatible with multilayer optical discs (including BDs and HD-DVDs) and to players, recorders, PCs and various other electronic devices with such an optical disc drive.

REFERENCE SIGNS LIST

100 optical disc
103 optical pickup
106 servo controller
228 aberration correction lens
260 disc distinguishing section
360 traverse moving direction sensing section
367 spiral direction sensing section

The invention claimed is:
1. A method for distinguishing a given multilayer optical disc comprising the steps of:
(X) determining what group the multilayer optical disc that has been loaded into an optical disc drive belongs to by a group determination method, the group determination method comprising: (A) measuring either a distance from a first one of multiple information layers of the given multilayer optical disc to a second one thereof, which is located adjacent to the first information layer, or a distance from the first information layer to the surface of the optical disc; and (B) determining, by the distance measured, what group the given multilayer optical disc belongs to, wherein at least one of the multiple groups comprises different types of multilayer optical discs which have different amounts of information layers from each other; and (Y) irradiating one of the information layers of the multilayer optical disc and determining, by the light beam that has been reflected from the information layer, how many information layers the multilayer optical disc has after the step (X).

2. The method of claim 1, wherein the step (A) includes the steps of:
  adjusting the light beam so as to make a spherical aberration correction to such a degree that is set for the first information layer of the given multilayer optical disc;
  shifting the point of convergence of the light beam perpendicularly to the surface of the multilayer optical disc while irradiating the optical disc with the adjusted light beam; and
  determining the distance from the surface of the optical disc to the first information layer by a difference between a first irradiation condition on which the point of convergence of the light beam is located on the surface of the optical disc and a second irradiation condition on which the point of convergence is located on the first information layer.

3. The method of claim 1, wherein the first information layer is located closer to the light incident surface of the multilayer optical disc than any other layer thereof is.

4. The method of claim 1, wherein the step (A) includes the steps of:
  adjusting the light beam so as to make a spherical aberration correction to a first degree that is set for the first information layer of the given multilayer optical disc;
  irradiating the multilayer optical disc that has been loaded into an optical disc drive with the adjusted light beam and changing the magnitude of the spherical aberration correction to make on the light beam into a second degree so that a focus error signal or a tracking error signal has the maximum amplitude on the first information layer; and
  determining, by the second degree of the spherical aberration correction, the distance from the surface of the multilayer optical disc that has been loaded into the optical disc drive to the first information layer thereof.

5. The method of claim 1, wherein the step (Y) includes the steps of:
  retrieving address information from one of the information layers that is located closer to the surface of the optical disc than any other layer is; and
  determining, by reference to the address information, how many information layers the multilayer optical disc has.

6. The method of claim 1, wherein the step (Y) includes the steps of:
  setting the magnitude of spherical aberration correction to be the first degree that is associated with one of the information layers of a first candidate multilayer optical disc, the information layer being located closer to the surface of the optical disc than any other layer thereof is, the first candidate multilayer optical disc being one of a number of multilayer optical discs that belong to the same group;
  irradiating that information layer of the multilayer optical disc loaded, which is located closest to the surface of the optical disc, with a light beam, for which the magnitude of spherical aberration correction has been set to be the first degree, thereby obtaining a first tracking error signal;
  setting the magnitude of spherical aberration correction to be the second degree that is associated with one of the information layers of a second candidate multilayer optical disc, the information layer being located closer to the surface of the optical disc than any other layer thereof is, the second candidate multilayer optical disc being another one of a number of multilayer optical discs that belong to the same group;
  irradiating that information layer of the multilayer optical disc loaded, which is located closest to the surface of the optical disc, with a light beam, for which the magnitude of spherical aberration correction has been set to be the second degree, thereby obtaining a second tracking error signal; and
  if the first tracking error signal has a greater amplitude than the second tracking error signal,
    determining the multilayer optical disc loaded to be the first candidate multilayer optical disc; but
  if the second tracking error signal has a greater amplitude than the first tracking error signal,
    determining the multilayer optical disc loaded to be the second candidate multilayer optical disc.

7. An optical disc distinguishing method for distinguishing, from each other, a single-layer BD, a double-layer BD, a triple-layer BD and a quadruple-layer BD, all of which have a reference layer at the same depth under their disc surface, the method comprising the steps of:
  setting the number of revolutions of an optical disc loaded to be a value that is associated with the single- and double-layer BDs, a value that is associated with the triple-layer BD, or a value that is associated with the quadruple-layer BD;
  getting a PLL locked on the reference layer of the optical disc, thereby determining which of first and second groups the optical disc loaded belongs to, wherein the first group is comprised of single- and double-layer BDs, and the second group is comprised of triple- and quadruple-layer BDs; and
  if the optical disc has turned out to belong to the second group, determining whether the optical disc loaded is a triple-layer BD or a quadruple-layer BD.

8. An optical disc distinguishing method for distinguishing an N-layer optical disc having N information layers (where N is an integer that is equal to or greater than three) from an (N+1)-layer optical disc having (N+1) information layers, the method comprising the steps of:
  irradiating a particular information layer of an optical disc loaded with a light beam;
  detecting the direction of a spiral pattern that is formed by tracks on the particular information layer; and
  determining, by the direction of the spiral pattern that is formed by the tracks, whether the optical disc loaded is an N-layer optical disc or an (N+1)-layer optical disc.

* * * * *